US010688665B2

(12) United States Patent
Fujimoto et al.

(10) Patent No.: US 10,688,665 B2
(45) Date of Patent: Jun. 23, 2020

(54) ROBOT SYSTEM, AND CONTROL METHOD

(71) Applicant: HITACHI, LTD., Tokyo (JP)

(72) Inventors: Keisuke Fujimoto, Tokyo (JP); Nobutaka Kimura, Tokyo (JP); Kohsei Matsumoto, Tokyo (JP)

(73) Assignee: HITACHI LTD., Tokyo (JP)

( * ) Notice: Subject to any disclaimer, the term of this patent is extended or adjusted under 35 U.S.C. 154(b) by 349 days.

(21) Appl. No.: 15/758,540

(22) PCT Filed: Jan. 6, 2016

(86) PCT No.: PCT/JP2016/050278
§ 371 (c)(1),
(2) Date: Mar. 8, 2018

(87) PCT Pub. No.: WO2017/119088
PCT Pub. Date: Jul. 13, 2017

(65) Prior Publication Data
US 2018/0250827 A1    Sep. 6, 2018

(51) Int. Cl.
*G06F 19/00*  (2018.01)
*B25J 9/16*   (2006.01)
*B25J 13/08*  (2006.01)

(52) U.S. Cl.
CPC .......... *B25J 9/1697* (2013.01); *B25J 9/1664* (2013.01); *B25J 13/08* (2013.01); *Y10S 901/09* (2013.01); *Y10S 901/47* (2013.01)

(58) Field of Classification Search
CPC ........ B25J 9/1697; B25J 13/08; B25J 9/1664; B25J 9/1612; B25J 9/1694; Y10S 901/09;
(Continued)

(56) References Cited

U.S. PATENT DOCUMENTS

| 5,597,498 A | 1/1997 | Sunayama et al. |
| 7,353,082 B2 * | 4/2008 | Pretlove ................. B25J 9/1664 318/568.2 |

(Continued)

FOREIGN PATENT DOCUMENTS

| JP | H04-205318 A | 7/1992 |
| JP | H07-251391 A | 10/1995 |

(Continued)

OTHER PUBLICATIONS

International Search Report for WO 2017/119088 A1, dated Mar. 1, 2016.

*Primary Examiner* — Ian Jen
(74) *Attorney, Agent, or Firm* — Volpe and Koenig, P.C.

(57) ABSTRACT

A robot system is provided in which various kinds of articles can be treated only with a small number of articles registered in advance, and an unknown article can be further treated as long as the article has a shape close to that of the article registered in advance. A robot system is disclosed which includes: a mechanism unit that manipulates an article to be manipulated; a shape measurement unit that measures a shape of an object; a basic operation storage unit that stores basic operation representing basic operation of the mechanism unit; an operation method calculation unit that deforms the stored basic operation to calculate an operation method on the basis of the shape of the object measured by the shape measurement unit; and a control unit that executes a control of the mechanism unit on the basis of the operation method calculated by the operation method calculation unit.

15 Claims, 18 Drawing Sheets

(58) Field of Classification Search
CPC ........ Y10S 901/47; G05B 2219/36404; G05B 2219/39534; G05B 2219/40564
See application file for complete search history.

(56) References Cited

U.S. PATENT DOCUMENTS

| | | | |
|---|---|---|---|
| 7,957,583 B2* | 6/2011 | Boca | B25J 9/1697 |
| | | | 345/419 |
| 8,965,580 B2* | 2/2015 | Brooks | B25J 9/0087 |
| | | | 700/259 |
| 9,092,698 B2* | 7/2015 | Buehler | B25J 9/0087 |
| 9,434,072 B2* | 9/2016 | Buehler | B25J 9/0087 |
| 2007/0239315 A1 | 10/2007 | Sato et al. | |
| 2015/0127162 A1 | 5/2015 | Gotou | |

FOREIGN PATENT DOCUMENTS

| | | |
|---|---|---|
| JP | 8-309537 A | 11/1996 |
| JP | H10-80881 A | 3/1998 |
| JP | 2011-224695 A | 11/2011 |
| JP | 2014-161965 A | 9/2014 |
| JP | 2015-089589 A | 5/2015 |
| WO | 2006/006624 A1 | 1/2006 |

* cited by examiner

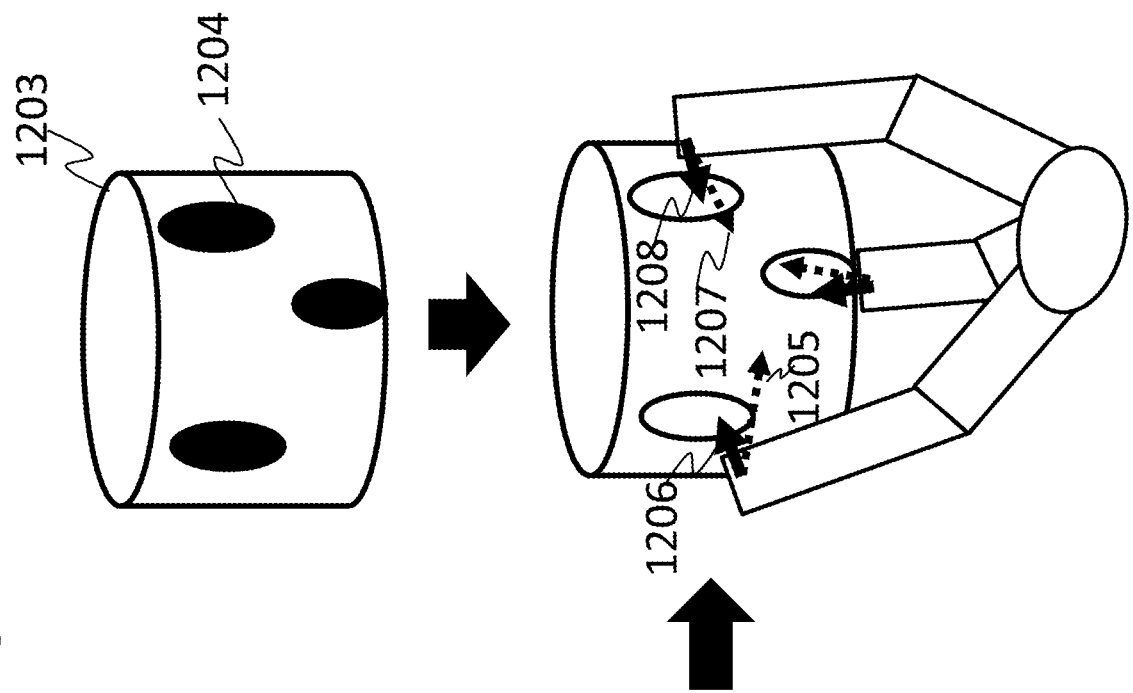
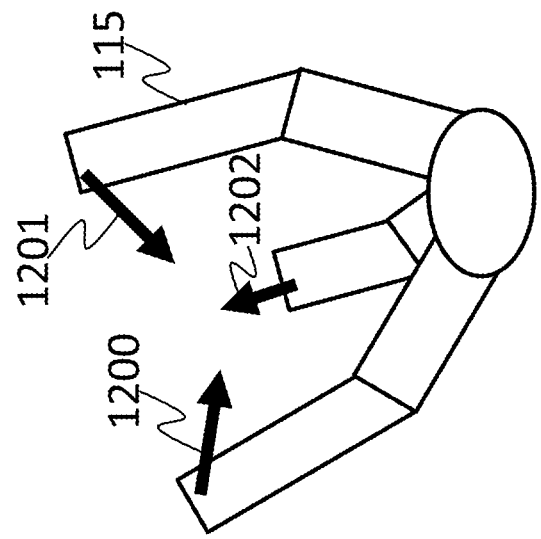
Fig. 12

ROBOT SYSTEM, AND CONTROL METHOD

TECHNICAL FIELD

The present invention relates to a system and a control method for a robot to manipulate an article.

BACKGROUND ART

In warehouses and factories, manipulation of an article using a robot (grasping, attaching, welding, or the like of the article) can be realized by teaching operation procedures to the robot in advance. The teaching is a work for causing an operator to store all of the operation procedures for manipulating a target article in the robot with the use of a controller or the like. However, in order to operate the robot according to the teaching, an assumption that a state of a manipulation target such as a shape or a posture is identical with that during teaching is required.

On the contrary, there is a method using a device that measures a shape of a surrounding environment of a stereo camera, a 3D sensor, or the like. With the use of the shape measurement device, it is possible to measure a distance to a surrounding entity, measure a three-dimensional shape of the entity, and recognize a shape, a position, and a posture of the target article. With the recognition of the environment and the operation of the robot on the basis of a situation, the target article can be manipulated even if an environmental situation is changed to some change. As an example using the shape measurement device, there is an operating method disclosed in PTL 1. In the above operating method, the target article is detected from the shape of the surrounding environment obtained by the measurement, and the detected posture of each article is recognized. The grasping operation is performed according to the recognized posture, thereby being capable of flexibly grasping the article even if the posture of each article is different.

CITATION LIST

Patent Literature

PTL 1: Japanese Patent Application Laid-Open No. 2011-224695
PTL 2: Japanese Patent Application Laid-Open No. 2014-161965
PTL 3: WO 2006/006624

SUMMARY OF INVENTION

Technical Problem

PTL 2 or PTL 3 discloses a technique in which grasping methods are stored for the respective postures of a target article in advance and any grasping method is selected on the basis of an actual posture of the target article, thereby being capable of performing the grasping. In the technique, there is a need for an operator to register information on a method of manipulating the article such as the shape of the target article and a grasping position of the article required for operating the robot according to the target article obtained by the measurement in advance. However, in order to handle plural kinds of articles in one system, there is a need to register the information on the shape and the manipulation method for each of the articles having different shapes.

Solution to Problem

Representative examples disclosed in present application are described as follows.

According to one aspect of the present invention, there is provided a robot system including: a mechanism unit that manipulates an article to be manipulated; a shape measurement unit that measures a shape of an object; a basic operation storage unit that stores basic operation representing basic operation of the mechanism unit; an operation method calculation unit that deforms the stored basic operation to calculate an operation method on the basis of the shape of the object measured by the shape measurement unit; and a control unit that executes a control of the mechanism unit on the basis of the operation method calculated by the operation method calculation unit.

According to a more specific configuration, for example, the robot system further includes: a basic shape storage unit that stores at least one or more pairs of basic shapes representing a predetermined shape and manipulation methods for the basic shapes by the mechanism unit; a basic shape association unit that selectively associates at least one of the basic shapes stored in the basic shape storage unit for the shape measured by the shape measurement unit with a selected basic shape; and a basic shape deformation unit that deforms the selected basic shape and a selected manipulation method that is the manipulation method paired with the selected basic shape according to the measured shape. In this case, the operation method calculation unit includes a basic operation deformation unit that deforms the basic operation on the basis of the deformed selected basic shape and the deformed selected manipulation method which have been deformed by the basic shape deformation unit, and calculates the operation method on the basis of the deformed basic operation that has been deformed by the basic operation deformation unit.

According to another aspect of the present invention, there is provided a control method for controlling a mechanism unit by an information processing device including a processing device, a storage unit, an input device, and an output device. In the method, the storage unit stores at least one or more pairs of basic shapes representing a predetermined shape and manipulation methods for the basic shapes by a mechanism unit. The processing device selects one basic shape from the stored basic shapes, and associates the selected basic shape with a measured shape input from the input device. Further, the processing device deforms the associated basic shape and the manipulation method that is paired with the associated basic shape according to the measured shape. Further, the processing device calculates the operation method of the mechanism unit on the basis of the deformed basic shape and the deformed manipulation method, and executes the operation of the mechanism unit on the basis of the operation method.

In a more specific example, the storage unit stores the basic operation that represents the basic simple operation of the mechanism unit, and when calculating the operation method of the mechanism unit, the processing device deforms the basic operation so as to be compatible with the deformed manipulation method, and calculates the operation method according to the deformed basic operation.

According to still another aspect of the present invention, there is provided a robot system including: a mechanism unit that manipulates an article to be manipulated; a basic shape setting unit that sets basic shapes representing a predetermined shape and manipulation methods for the basic shapes by the mechanism unit; a basic shape storage unit that stores at least one or more pairs of the basic shapes and the manipulation methods set by the basic shape setting unit; a shape measurement unit that measures a surrounding shape; a basic shape association unit that associates the basic shape stored in the basic shape storage unit with a shape is close to the shape measured by the shape measurement unit; a basic shape deformation unit that deforms the basic shape and the manipulation method according to the measured shape; and an operation method calculation unit that calculates the operation method of the mechanism unit on the basis of the deformed shape and the deformed manipulation method which has been deformed by the basic shape deformation unit; and a control unit that performs operation on the basis of the operation method calculated by the operation method calculation unit.

Advantageous Effects of Invention

According to the present invention, various kinds of articles can be treated only with a small number of articles register in advance, and an unknown article can be further treated as long as the article has a shape close to that of the article registered in advance.

BRIEF DESCRIPTION OF DRAWINGS

FIG. 12 is a perspective view of a basic operation deformation process.

DESCRIPTION OF EMBODIMENTS

Figure 1:
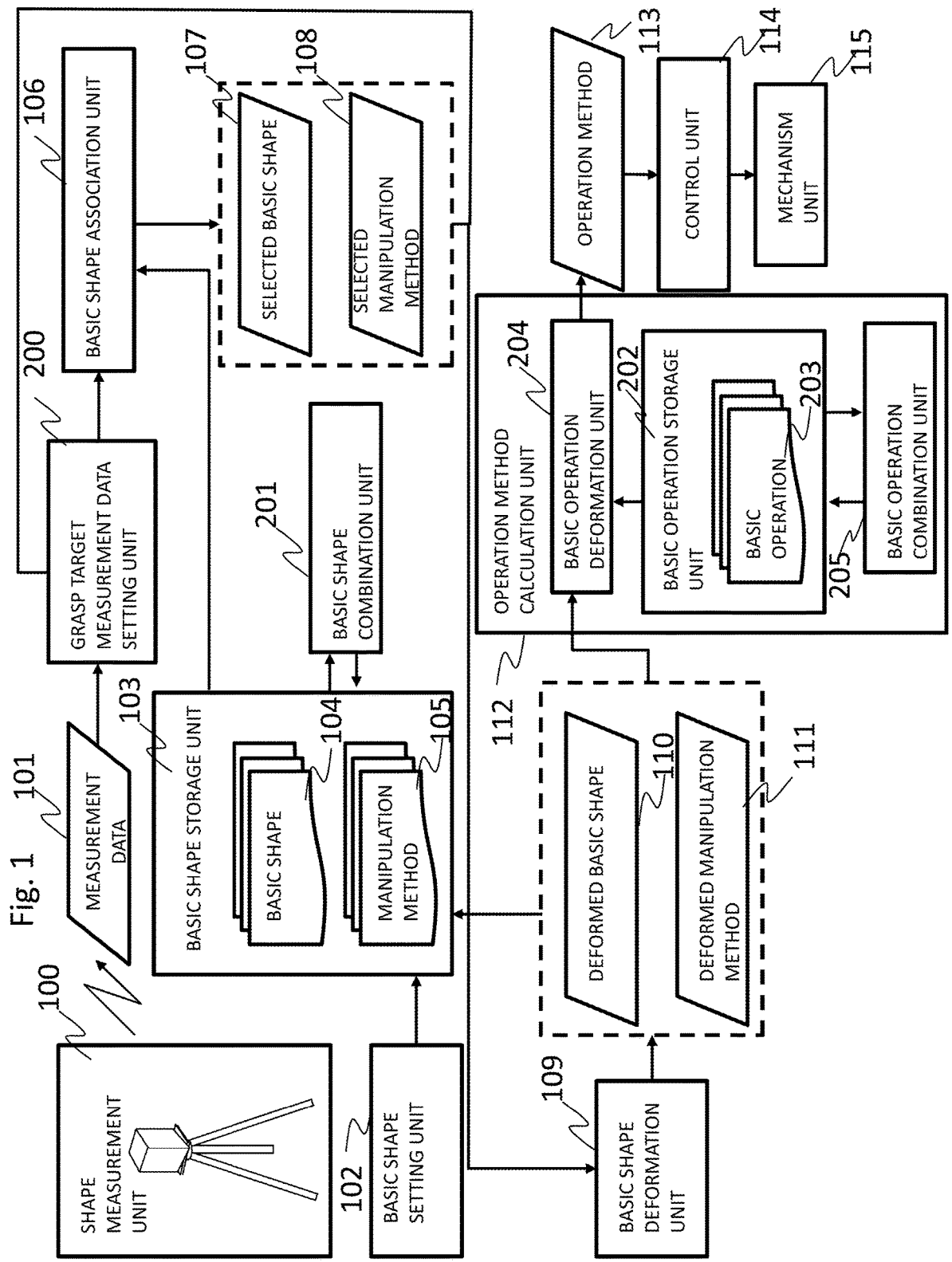
FIG. 1 is a block diagram of a detailed configuration according an example of the present invention.

An embodiment will be described in detail with reference to the accompanying drawings. However, the present invention should not be construed as being limited to the description of the embodiment described below. It will be easily understood by those skilled in the art that a specific configuration can be changed without departing from the spirit or scope of the present invention.

In the configuration of the invention described below, the same reference numerals are used for the same parts or parts having similar functions in different drawings, and a redundant description may be omitted.

The notations such as "first", "second", and "third" in the present specification and the like are attached to identify components, and do not necessarily limit the number or order. The number for identifying the component is used for each context and the number used in one context does not necessarily indicate the same configuration in other contexts. The component identified by a certain number does not preclude the function the component identified by other numbers.

In order to facilitate the understanding of the invention, the position, size, shape, range, and so on of each configuration shown in drawings or the like may not indicate the actual position, size, shape, range, and so on. Therefore, the present invention is not necessarily limited to the position, size, shape, range and so on disclosed in drawings and the like.

Example 1

Hereinafter, an example of the present invention will be described with reference to the drawings. The example will be briefly first described, and then each part will be described in detail.

FIG. 1 is a diagram of a detailed configuration of a robot system according to the present example, which shows functional blocks configuring the example and information (data) to be processed. In the present example, a description will be given of a system for grasping an arbitrary target article with the use of a finger mechanism on a manipulator as an example of a manipulator robot for mounting a manipulator for grasping the target article on the robot.

First, shape measurement unit 100 measures and outputs measurement data 101 indicating a shape of an object to be grasped. In the present example, a point cloud is treated as an example of the measurement data 101. However, the measurement data 101 is not limited to the point cloud so far as the measurement data 101 is data indicating the shape.

A basic shape setting unit 102 sets basic shapes prepared in advance by an operator and manipulation methods showing how a mechanism unit 115 manipulates the basic shapes, and stores the basic shapes and the manipulation methods in a basic shape storage unit 103. In the present example, an arbitrary shape and manipulation method are created by deforming a predetermined basic shape and manipulation method according to measurement data, and a basic simple shape before deformation is taken as a basic shape.

Examples of basic shapes include cubes, cylinders, spheres, and so on. Moreover, if a rough shape of an article to be treated is known, shape that is similar to the shape of the article may be used as the basic shape. The basic shape is any type of shape which is not yet deformed and is not limited to the above cases. The multiple basic shapes 104 and the multiple manipulation methods 105 which have been set by the shape setting unit 102 are paired and stored in the basic shape storage unit 103.

When the system according to the present example manipulates the target article, a basic shape association unit 106 first selects any one of the basic shapes 104 stored in the basic shape storage unit, which is closest to the measurement data 101, and selects the stored manipulation method 105 paired with the selected basic shape 104. The selected basic shape is set as a selected basic shape 107 and the selected manipulation method is set as a selected manipulation method 108. The selection may be automatically performed by the system through software, may be manually selected visually by the operator, or may be performed by combination of automatic operation and manual operation.

Further, a basic shape deformation unit 109 deforms the shape of the selected basic shape 108 so that the shape of the selected basic shape 108 geometrically coincides with the measurement data 101, and performs similar deformation on the selected manipulation method 108. The deformed selected basic shape 107 is set as a deformed basic shape 110, and the deformed selected manipulation method 108 is set as a deformed manipulation method 111.

The operation method calculation unit 112 determines an operation method 113 of the mechanism unit 115 according to the deformed manipulation method 111 and an operation range of the mechanism unit 115. It is assumed that data such as the operation range of the mechanism unit is stored as a constraint condition in a storage device accessible by the system. Finally, a control unit 114 controls the mechanism unit 115 on the basis of the operation method 113. More specifically, the control unit 114 controls the operation amount and so on of an actuator and the like configuring the mechanism unit 115.

The system in FIG. 1 can be configured with the use of a general information processing device (hereinafter, a server will be exemplified as a typical example) including a processing device, storage device, an input device, and an output device. The functions of the basic shape setting unit 102, the basic shape association unit 106, the basic information deformation unit 109, the operation method calculation unit 112, the control unit 114 and the like perform defined processes in cooperation with other hardware by allowing the processing device to execute programs stored in the storage device. In the present description, a program to be executed by a server or means for realizing the function of the server is referred to as "function", "means" "unit", "module", or the like in some cases.

The measurement data 101, the basic shape 104, the manipulation method 105, the selected basic shape 107, the selected manipulation method 108, the deformed basic shape 110, the deformed manipulation method 111, the operation method 113 and the like are temporarily or permanently stored in a storage device such as a semiconductor memory or a hard disk. The shape measurement unit 100 is configured to input the measurement data 101 from an input device (input interface) of the server to the storage device or the processing device through a wired or wireless path. The mechanism unit 115 includes a manipulator to be described later and the like, and is controlled by the control unit 114 through an output device (output interface) of the server, to thereby be mechanically driven. The server can also include a display device such as a monitor and an input device such as a keyboard and a mouse.

The above system configuration may be configured by a single server, or any part of the input device, the output device the processing device, and the storage device may be configured by another server connected over a network.

In the present example, the same functions as functions configured by software can be realized by hardware such as an FPGA (field programmable gate array) and an ASIC (application specific integrated circuit).

Figure 2:
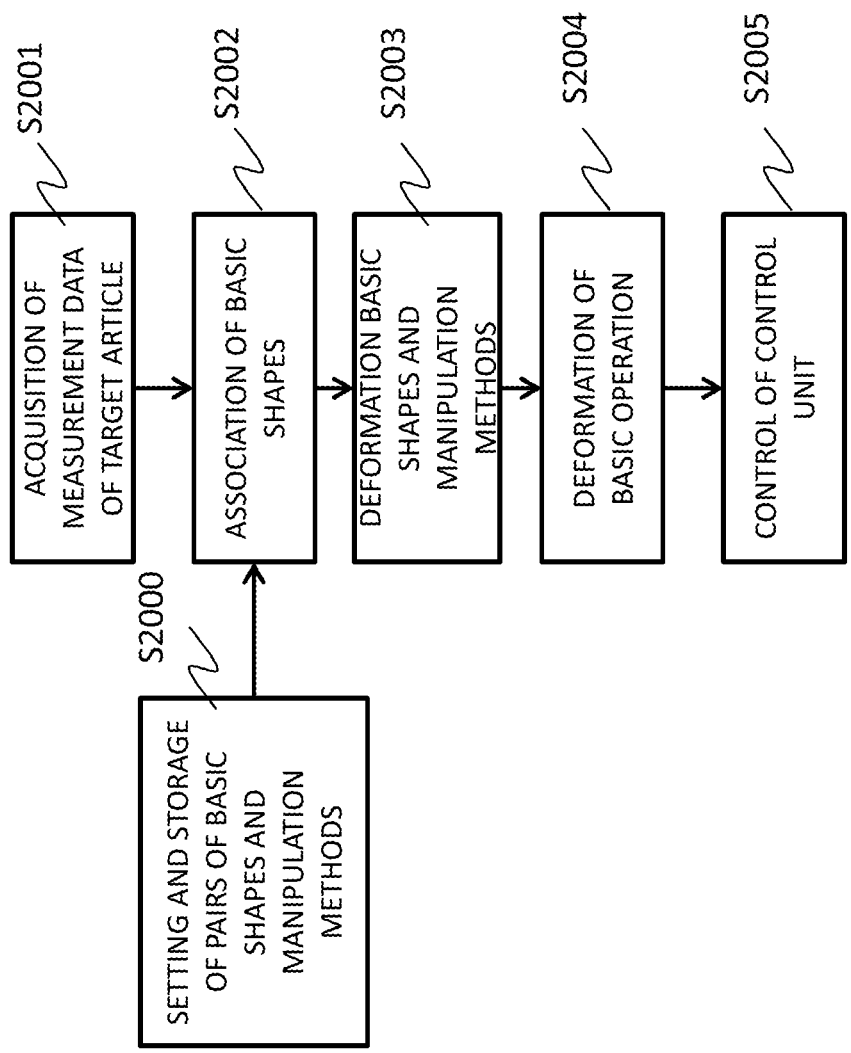
FIG. 2 is a flowchart of processing according to the example of the present invention.

FIG. 2 is a flowchart showing an outline of a processing flow of the system according to the present example shown in FIG. 1. In the system, a pair of the basic shape 104 and the manipulation method 105 is set and stored in advance (S2000). This will be described in detail later with reference to FIGS. 4 and 5.

In the processing of the target article by the mechanism unit (manipulator) 115, the measurement data 101 of the target article is first acquired (S2001). This operation will be described in detail later with reference to FIGS. 7 and 8.

Next, the measurement data 101 is associated with the basic shape 104 and a pair of the basic shape having a shape similar to the measurement data 101 and the manipulation method is selected (S2002). The selection may be automatically performed or may be performed by the operator. This will be described in detail later with reference to FIG. 9.

Next, a pair of the selected basic shape 107 and the selected manipulation method 108 which have been selected is deformed on the basis of the measurement data 101 (S2003). This will be described in detail later with reference to FIG. 10.

Next, the basic operation 203 is deformed on the basis of the deformed basic shape 110 and the deformed manipulation method 111 which have been deformed (S2004). This will be described in detail later with reference to FIGS. 11 to 13. Finally, with the deformed basic operation, the mechanism unit is controlled to process the target article (S2005).

Returning to FIG. 1, the configuration of the system according to the present example will be described in more detail. First, the shape measurement unit 100 measures and outputs the measurement data 101 showing a surrounding shape with the use of an optical measurement device or the like. When the measurement data 101 is obtained by simultaneously measuring a shape of the entire surroundings other than the object to be grasped, it is assumed that only partial data of the object to be grasped is extracted from the measurement data 101 by a grasp target measurement data setting unit 200. When the measurement data 101 is obtained by measuring only the object to be grasped, the grasp target measurement data setting unit 200 may output the measurement data 101 as it is, or the grasp target measurement data setting unit 200 may be eliminated.

The basic shape setting unit 102 sets the basic shapes prepared in advance by the operator as well as the manipulation methods showing how the mechanism unit 115 manipulates the basic shapes, and stores the basic shapes and the manipulation methods in the basic shape storage unit 103. In this example, multiple manipulation methods may be set for a predetermined basic shape.

The basic shapes 104 and the manipulation methods 105 can be prepared as data files and stored in the basic shape storage unit 103 through the input interface of the server in advance. Alternatively, the basic shapes 104 and the manipulation methods 105 can be input direct flora the keyboard or the like which is the input device of the server. In order to facilitate the input, as will be described later with reference to FIGS. 4 and 5, information necessary for a monitor which is an output device of the server may be displayed.

In the present example, it is assumed that an arbitrary shape and manipulation method are created by deforming a predetermined basic shape and manipulation method according to the measurement data, and a basic simple shape before deformation is taken as a basic shape. Examples of the basic shapes include cubes, cylinders, spheres, and so on. Moreover, if a rough shape of the article to be treated is known, a shape that is similar to the shape of the article may be used as the basic shape. It is assumed that the basic shape is any type of shape which is not yet deformed and is not limited to the above cases. It is assumed that the multiple basic shapes 104 and the multiple manipulation methods 105 which have been set by the shape setting unit 102 are paired and stored in the basic shape storage unit 103.

It is assumed that the basic shape combination unit 201 combines two or more pairs of basic shapes 104 and manipulation methods 105 together, creates a new pair of basic shape 104 and manipulation method 105, and stores the new pair in the basic shape storage unit 103.

When the system according to the present example manipulates a target article, the basic shape association unit 106 first selects a basic shape 104 having a predetermined relationship with the measurement data 101 from the basic shapes 104 stored in the basic shape storage unit 103, and selects the manipulation method 105 stored as a pair with the selected basic shape 104. It is assumed that the selected basic shape is set as the selected basic shape 107 and the selected manipulation method is set as the selected manipulation method 108. As the basic shape to be selected, the basic shape association unit 106 can be configured to automatically select the basic shape smallest in a magnitude of a geometric difference from the shape measured by the shape measurement unit, from the multiple basic shapes.

Alternatively, the basic shape association unit 106 may select multiple basic shapes similar to the measurement data, and may allow the operator to select any basic shape from the selected basic shapes. Alternatively, if the number of basic shapes is restricted, the basic shape association unit 106 may display all of the basic shapes 104 in an enumerated manner, and allow the operator to select a similar shape from those basic shapes.

Further, the basic shape deformation unit 109 deforms the shape of the selected basic shape 107 so that the shape of the selected basic shape 107 geometrically coincides with the measurement data 101 of the object to be grasped, and similarly deforms the selected manipulation method 108. It is assumed that the deformed selected basic shape 107 is defined as the deformed basic shape 110 and the deformed selected manipulation method 108 is defined as the deformed manipulation method 111. The deformed selected manipulation method 108 and the deformed manipulation method 111 may be paired and added in the basic shape storage unit 103. With a configuration in which the deformed selection manipulation method 108 and the deformed manipulation method 111 are added as additional data, the additional data can be used as it is for the same object to be grasped.

The operation Method calculation unit 112 determines the operation method 113 of the mechanism unit 115 according to the deformed manipulation method 111 and the operation range of the mechanism unit 115. In this example, if plural types of manipulation methods are set for the target basic shape, there are plural types of deformed manipulation methods 111. At this time, the operator may select any one of the manipulation methods. Alternatively, the operation method calculation unit 112 may select the operation method 113 or the like closest to a posture of the current mechanism unit 115.

The operation method calculation unit 112 deforms the basic operation 203 stored in the operation storage unit 202 by the basic operation deformation unit 204 on the basis of the deformed basic shape 110 and the deformed manipulation method 111, to thereby determine the operation method 113.

Further, the basic operation combination unit 205 combines two or more types of basic operation, to thereby create new basic operation and store the new basic operation in the basic operation storage unit 202. Finally, the control unit 114 controls the mechanism unit 115 on the basis of the operation method 113.

Incidentally, although FIG. 1 includes the grasp target measurement data setting unit 200 and the basic shape combination unit 201, the measurement data 101 can measure the shape of the object to be grasped. If the shape of the object to be grasped can be represented by deformation of the basic shape stored in the basic shape storage unit 103 even if the basic shape combination unit 201 does not add a shape, the operation can be performed even if the basic shape combination unit 201 is omitted.

Referring to FIG. 1, it is preferable that the basic shape storage unit 103 and the basic operation storage unit 202 are configured by, for example, a nonvolatile semiconductor device or a hard disk. In the example of FIG. 1, the basic operation storage unit 202 is incorporated in the operation method calculation unit 112. However, it is needless to say that the basic operation storage unit 202 may be located outside the operation method calculation unit 112. As a specific configuration example, the basic shape storage unit 103 and the basic operation storage unit 202 can be configured as separate data files in the same hard disk device. The robot system has only to access those data files, and the data files do not have to be necessarily incorporated in the robot system. For example, the data files may be stored in an external server that can be accessed by the robot system over the network.

The grasp object measurement data setting unit 200, the basic shape combination unit 201, the basic operation deformation unit 204, the basic operation combination unit 205, and the like perform defined processes in cooperation with other hardware by allowing the programs stored the storage device to be executed by the processing device.

Figure 3:
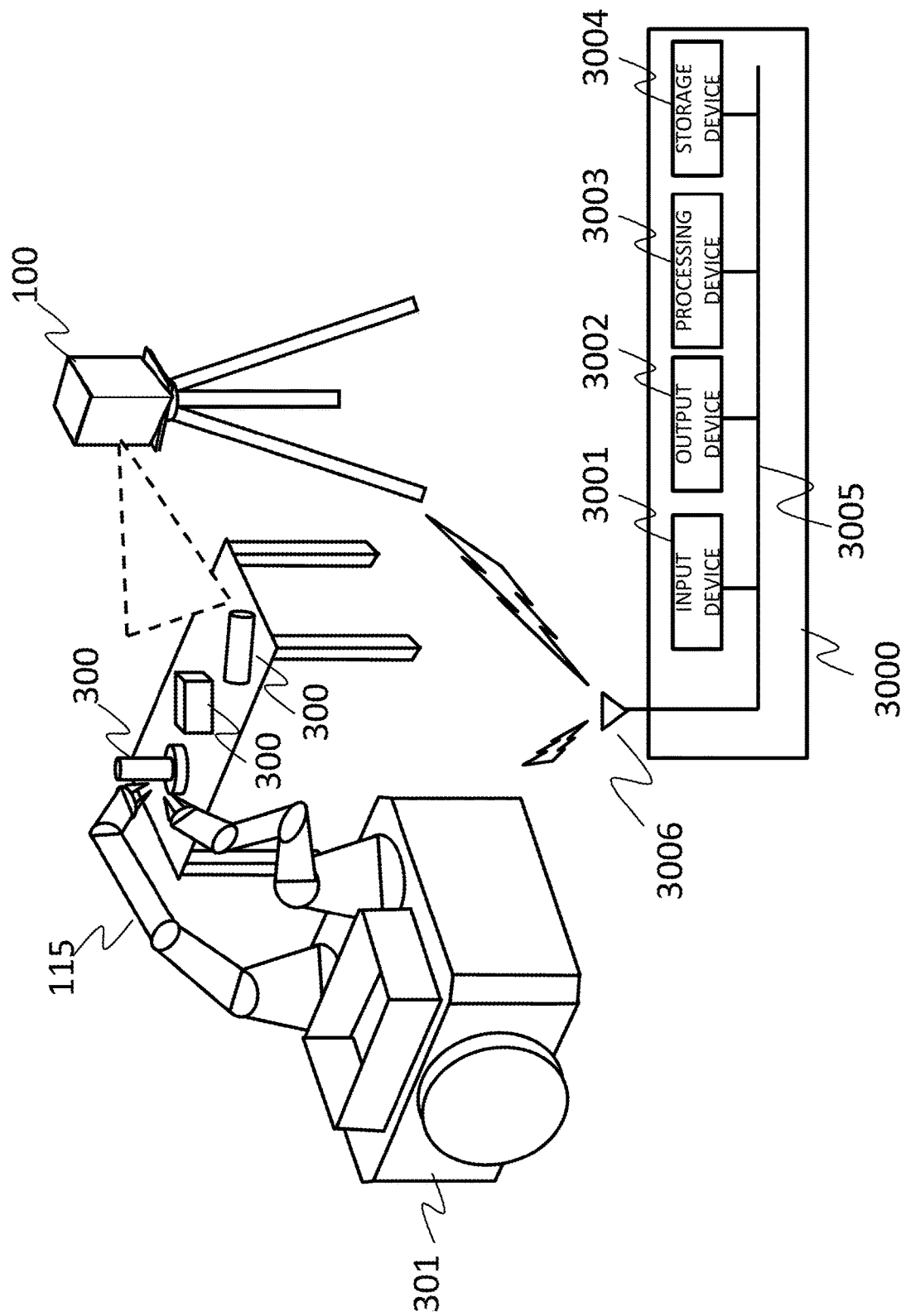
FIG. 3 is a perspective view of an overall manipulation system according to the example of the present invention.

FIG. 3 shows an overall view of a manipulator system according to one example of the present invention. It is assumed that the shape measurement unit 100 measures an article 300 in the environment and the mechanism unit 115 grasps the article 300. In this example, it is assumed that the mechanism unit 115 has multiple Linger mechanisms. The mechanism unit 115 is not limited to a manipulator that catches and grasps the article, but and may be applied to an adsorption manipulator that adsorbs the article. In addition, the mechanism unit 115 is not limited to the grasping and adsorption of the article, but may be applied to any manipulation of a predetermined portion of the target object by a predetermined method. The manipulation may include the operation of supporting the article from below to lift the article, the operation of shifting the article from a side, and the operation catching a flying target article.

The mechanism unit 115 can be configured to be mounted on a carriage 301 so as to be movable, for example. The server that realizes the respective units shown FIG. 1 can be incorporated in the carriage 301 and moved together with the mechanism unit 115. Alternatively, as shown in FIG. 3, a server 3000 can be installed in a remote place as a separate body from the carriage 301. In the server 3000, an input device 3001, an output device 3002, a processing device 3003, a storage device 3004, and so on are connected to each other through a bus 3005, to realize the configuration shown in FIG. 1. In the configuration of FIG. 3, the control unit 114 of the server 3000 may manipulate the mechanism unit 115 wirelessly or by wire with the use of an interface 3006. Moreover, the shape measurement unit 100 can also be connected to the server interface 3006 wirelessly or by wire.

Figure 4:
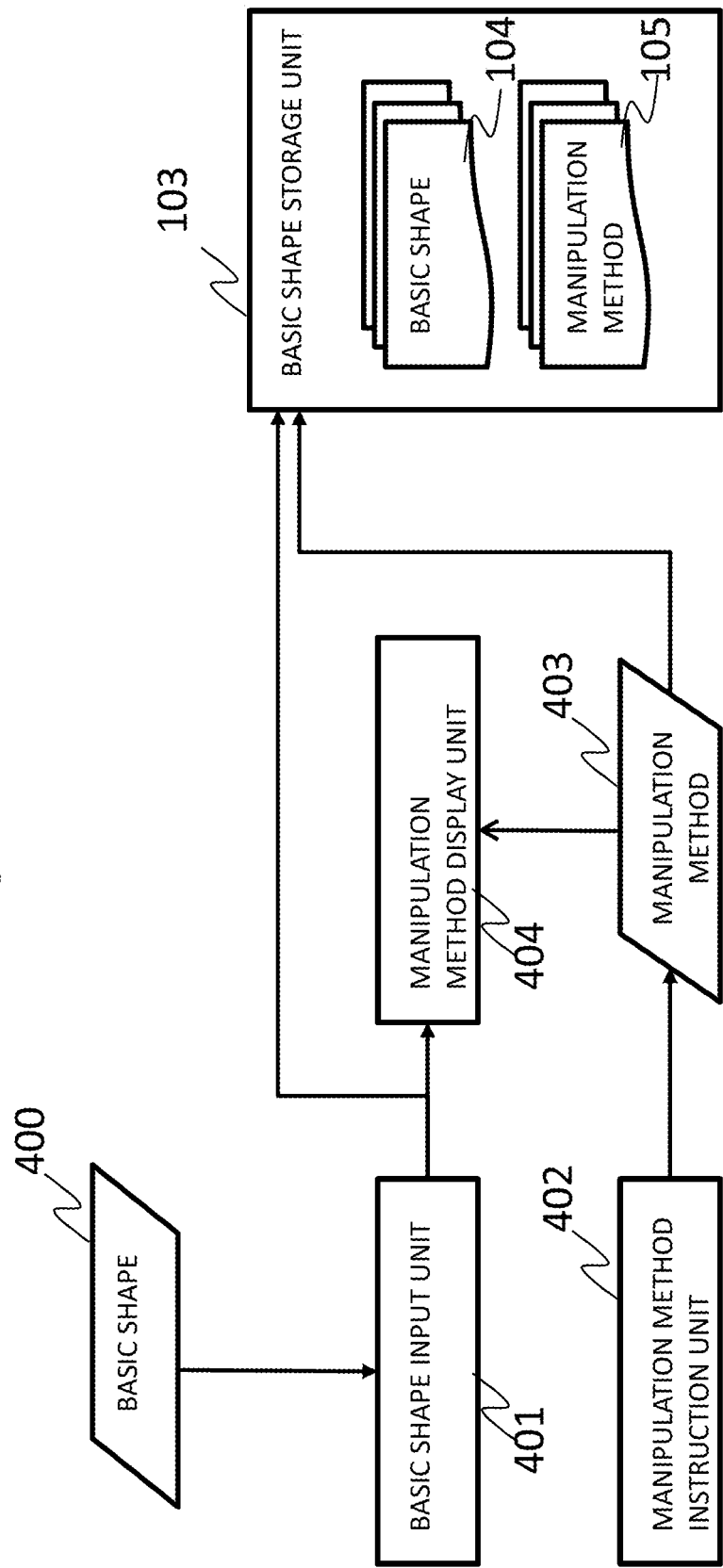
FIG. 4 is an illustrative view of operation of a basic shape setting unit.

FIG. 4 shows an example of the operation controlled by the basic shape setting unit 102 for setting a predetermined basic shape input procedure and a manipulation method for the basic shape.

First, a basic shape 400 is created with the use of existing CAD software or the like. As is well known, for example, the CAD software is stored in the storage device 3004 of the server and executed by the processing device 3003. The creation and input of the basic shape 400 can be performed by allowing the user to manipulate the output device 3002 of the server such as a monitor, and the input device 3001 of the server such as a keyboard, a mouse, or a tablet. The data of the created basic shape 400 can be stored in the storage device 3004 such as a hard disk.

In the present example, an arbitrary shape and manipulation method are created by deforming a predetermined basic shape and manipulation method according to the measurement data, and a basic simple shape before deformation is taken as a basic shape. Examples of the basic shapes include cubes, cylinders, spheres, and so on. Moreover, if a rough shape of the article to be treated is known, a shape that is close to the shape of the article may be used as the basic shape. It is assumed that the basic shape is any type of shape which is not yet deformed and is not limited to the above cases. It is assumed that the basic shape 400 may be any type of shape which is a format representing the shape.

The following operation is entirely controlled by software of the basic shape setting unit 102. The basic shape 400 is input by a basic shape input unit (for example, an input interface of data from the outside of the server 3000, which is a part of the input device 3001) 401, and displayed on a manipulation method display unit (for example, a monitor which is a part of the output device 3002) 404. The operator sets a manipulation method 403 by a manipulation method instruction unit (for example, a keyboard or a mouse, which is a part of the input device 3001) 402 while watching the basic shape 400 displayed on the manipulation method display unit 404. In this case, plural types of manipulation methods may be set for the predetermined basic shape.

In the operation of grasping the article, as an example the manipulation method, a position at which the finger mechanism is to be attached is set. It is assumed that the manipulation method is not limited to the setting of the position at which the finger mechanism is to be attached. For example, in the case of the operation of supporting the article from below, the position to be supported may be set as the manipulation method. In the case of the operation of shifting the target article from the side, it is assumed that the manipulation position at which the article does not fall may be set. In addition, if the operation of catching the flying target article is targeted, a catching position and operation relative to a flight angle of the target article may be set.

Further, the input basic shape 400 and the set manipulation method 403 are paired and stored in the basic shape storage unit 103. This operation is performed multiple times, to thereby store multiple pairs of the basic shapes 104 and the manipulation methods 105 in the basic shape storage unit. Incidentally, the combination of the basic shape and the manipulation method is not limited to one to one but may be one to many.

As described above, the pairs of the basic shapes 104 and the manipulation methods 105 can be prepared in the basic shape storage unit 103. The basic shape setting unit 102 or a part other than the basic shape storage unit 103 in FIG. 4) in FIG. 1 may be configured separately from the robot system so as to be connected to the robot system only at the time of shipping or maintenance of the robot system and store the data in h basic shape storage unit 103.

Figure 5:
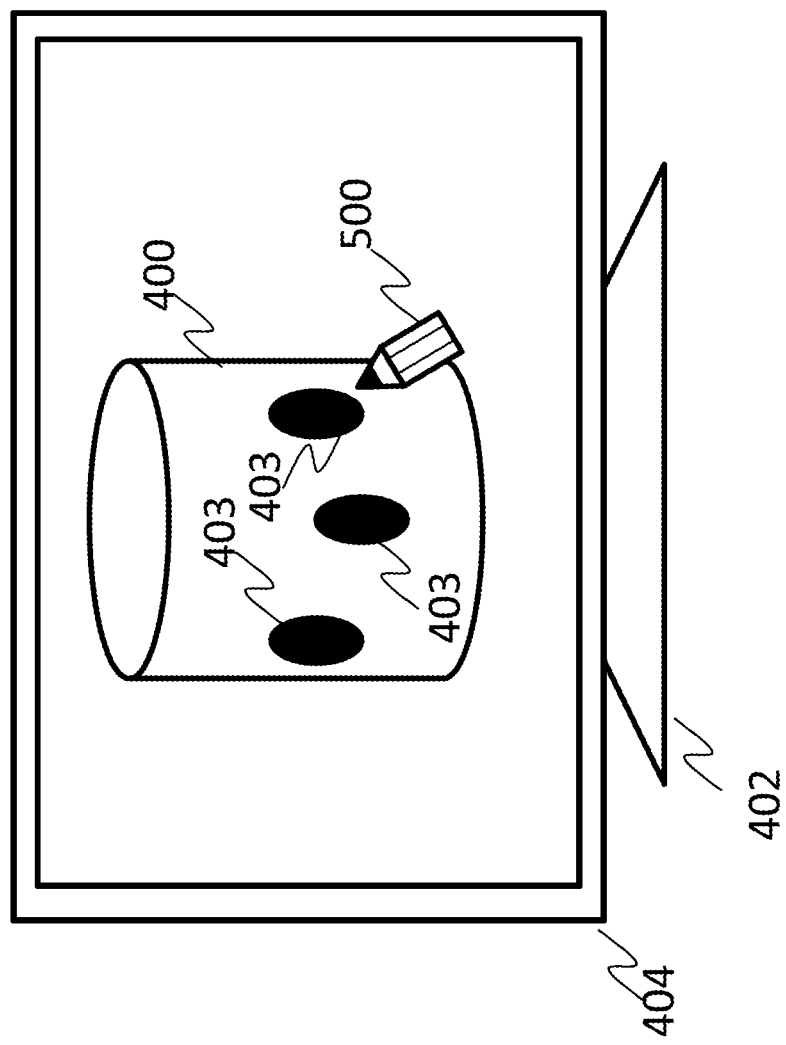
FIG. 5 is a front view of a basic shape setting screen.

FIG. 5 shows an example an interface of a basic shape setting screen controlled by the basic shape setting unit 102. In the present example, in order to target the operation of grasping the article, is assumed that a grasp position of the article is set as the manipulation method. First, it is assumed that the basic shape 400 and the set manipulation method (the grasp position in this example) 403 are displayed on the manipulation method display unit (for example, monitor) 404. The operator manipulates a pointer 500 with the use of the manipulation method instruction unit (for example, keyboard) 402 and instructs the grasp position 403 from the displayed basic shape 400. Then, the instructed grasp position 403 is registered for the displayed basic shape 400, and reflected on the manipulation method display unit 404 as the manipulation method 105. In this manner, the manipulation method 105 is defined, and the multiple pairs of the basic shapes 104 and the manipulation methods 105 are stored.

As the instruction method of the manipulation method instruction unit 402, the grasp position 403 is not written by the pointer 500, but an instruction operation mode may be switched to another, thereby being capable of deleting or moving the written grasp position 403. The control of the interface including the control of the keyboard and the display of the monitor is performed by causing the processing device to execute the software of the basic shape setting unit 102 stored in the storage device.

Figure 6:
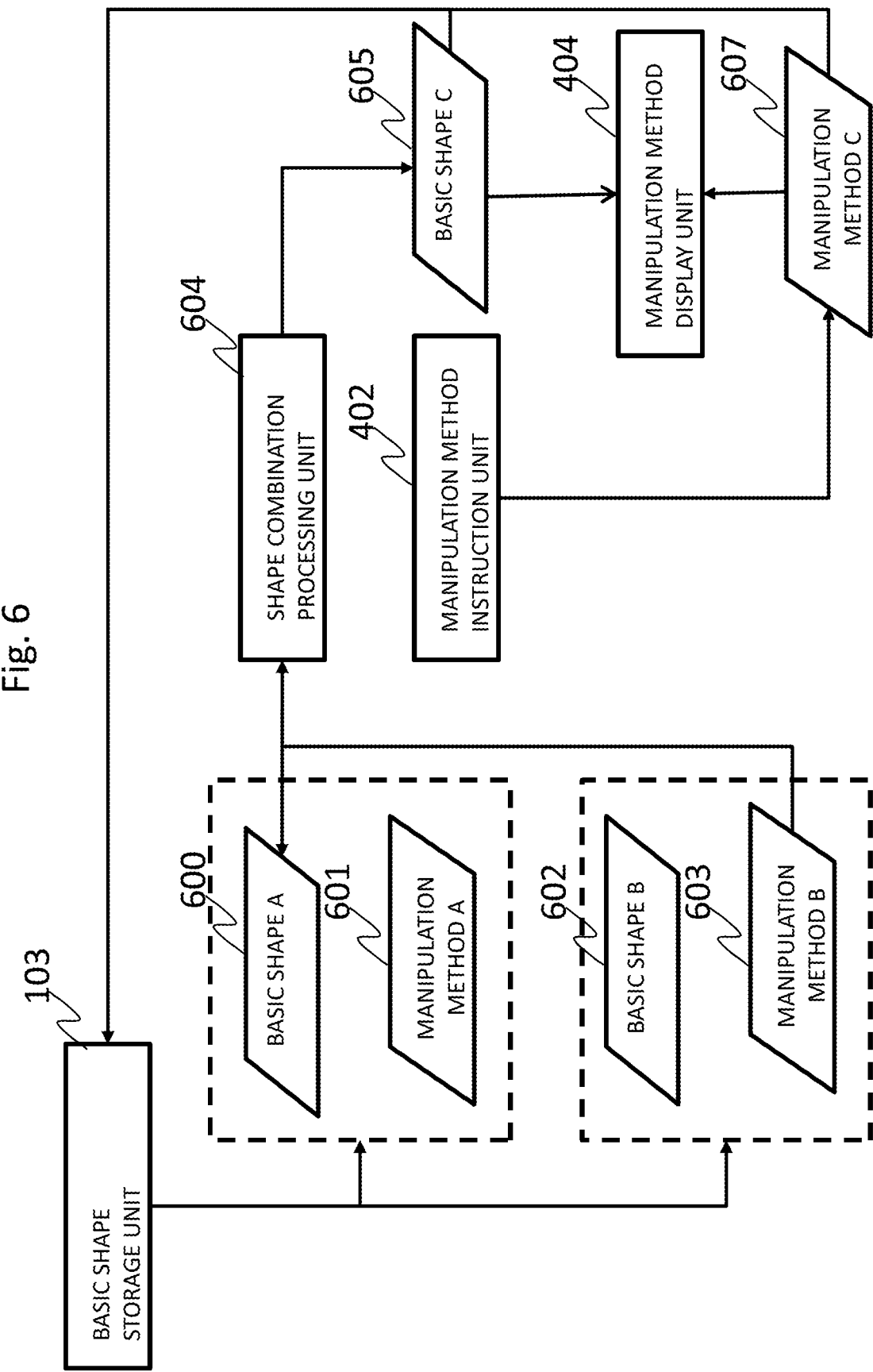
FIG. 6 is an illustrative view of the operation of a basic shape combination unit.

FIG. 6 shows details of an example of the processing of the basic shape combination unit 201, which combines the multiple basic shapes and the multiple manipulation methods, which are set by the basic shape setting unit 102, to thereby create a new basic shape and manipulation method.

As shown in FIG. 1, the multiple pairs of basic shapes 104 and manipulation methods 105 are stored in the basic shape storage unit 103. First, two or more types of predetermined basic shapes and manipulation methods are selected from those pairs. In this example, it is assumed that a pair of basic shape A600 and manipulation method A601 and a pair of basic shape B602 and manipulation method B603 are extracted.

The extracted basic shape A600 and the extracted basic shape B602 are combined together by a shape combination processing unit 604. As a specific combination method, for example, the shapes are expressed by an implicit function or a CSG (constructive solid geometry) model and subjected to addition Or subtraction so as to be combined together. Alternatively, the combination position and the combination method may be instructed from the interface. It is assumed that the technique that can combine the shapes together is not limited to the above case. The above combination process is performed by causing the processing device 3003 to execute the software of the shape combination processing unit 604 stored in the storage device 3004. The shape combination processing unit 604 outputs the combined shape as a basic shape C605.

The manipulation method display unit 404 displays the basic shape C605 and the manipulation method instruction unit 402 sets the manipulation method 607. The setting method by the manipulation method instruction unit 402 and the display method of the manipulation method display unit 404 are the same as the method shown in FIGS. 4 and 5. The manipulation method may be set for the shape displayed on the screen. It should be noted that a manipulation method C607 may be obtained by copying the manipulation method A601 and the manipulation method B603.

As with the basic shape setting unit 102, the basic shape combination unit 201 can also be configured separately from a robot system main body.

Figure 7:
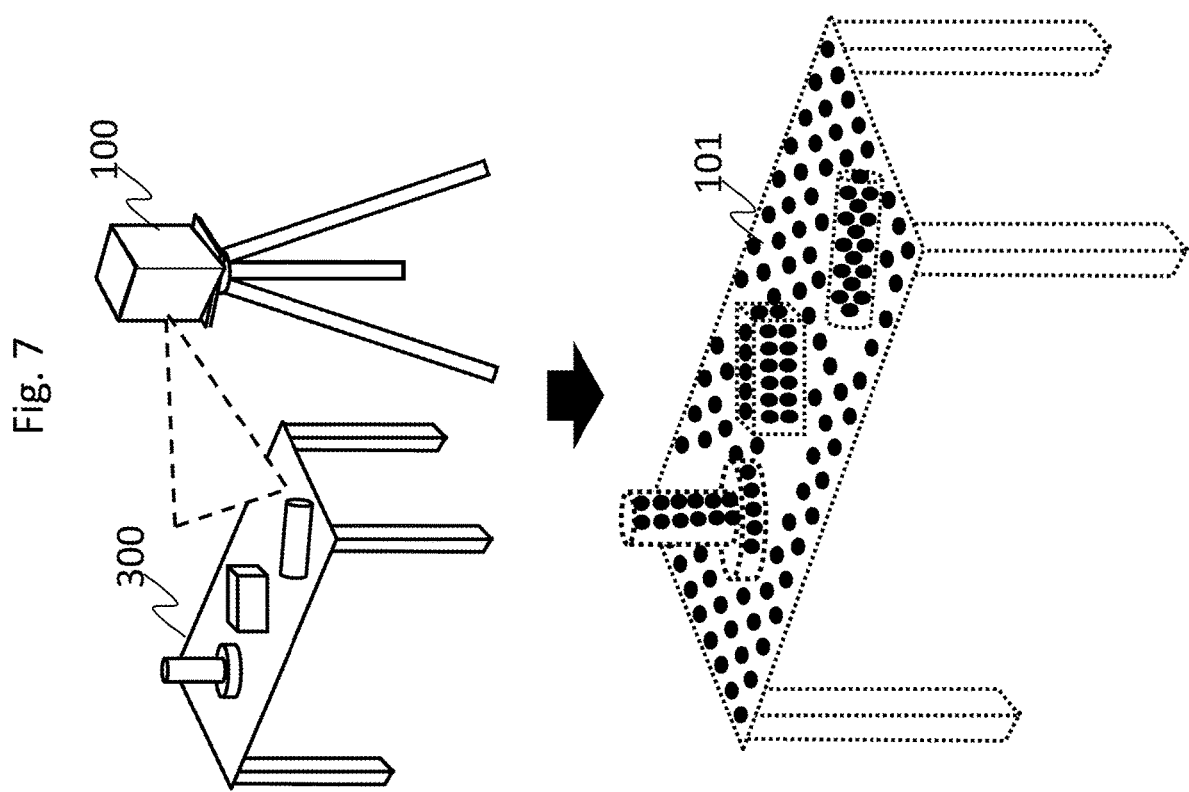
FIG. 7 is a perspective view of a shape measurement unit.

FIG. 7 shows how the shape measurement unit 100 measures the surrounding article 300. The shape measurement unit 100 irradiates a laser in a direction of the article (object to be measured or object to be grasped) 300, and measures a time until the laser is reflected and returned from the article 300, thereby being capable of measuring a distance to an existence present in the irradiation direction. The shape measurement unit 100 repetitively performs the irradiation process in all directions, thereby being capable of measuring the entire surrounding shape of the existence. As a result of measurement, since one point on a surface of the surrounding object can be measured for one irradiation of the laser, the surrounding shape can be measured as a point cloud with repetition of the measurement. As the measurement result of the article 300, measurement data 101 is obtained. The shape measurement device is not limited to the device using the laser so far as the device can measure the shape, and may be a stereo vision method, a method using ultrasound, or the like.

Figure 8:
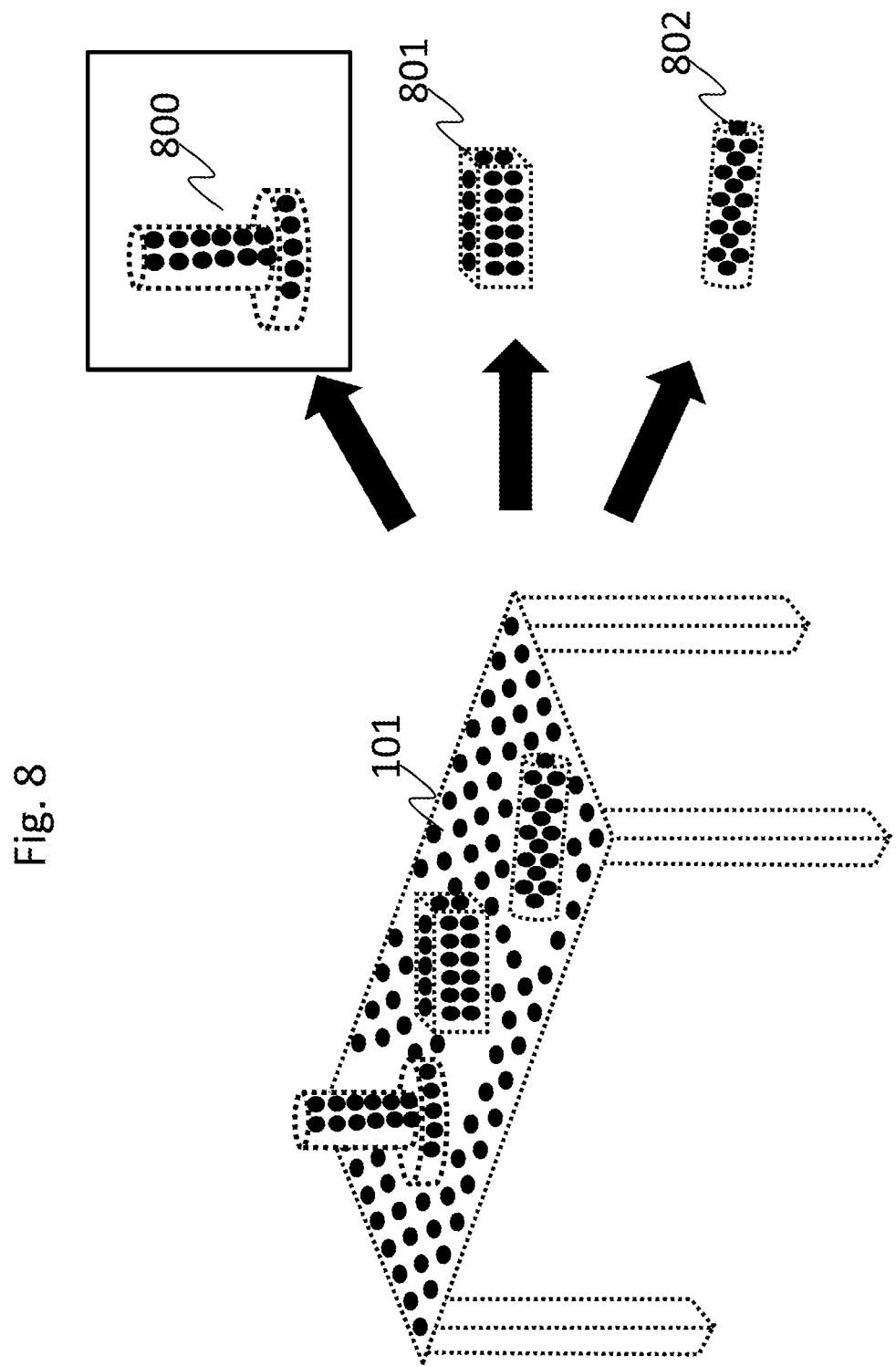
FIG. 8 is a conceptual diagram of a manipulation target extraction process.

FIG. 8 shows a manipulation target extraction process in which the Grasp target measurement data setting unit 200 extracts only partial measurement data relating to the object to be grasped from the measurement data 101 measured by the shape measurement unit 100. When the shape measurement unit 100 measures the entire surrounding shape, a surrounding environment shape and multiple objects to be grasped are reflected in the measurement data 101. For that reason, there is a need to extract only the shapes of the objects to be grasped from the measurement data 101. When the shape of the object to be grasped is known, the previously stored shape geometrically matches the measured point cloud and the point cloud of the object to be grasped can be cut out with the use of the most matching portion.

In addition, when the object in the environment is placed on a flat surface as shown in FIG. 7, the flat surface is removed from the point cloud and the points closer to each other are collected from the remaining point clouds and clustered so as to be divided into by measurement data 800, measurement data 801, and measurement data 802.

In the removal of the flat surface, since the flat surface can be extracted by subjecting the point cloud to a Hough transform, the point cloud on the extracted surface may be removed. Even if the surface is not flat, the shape of the environment in a state where there is no object in the surroundings is recorded in advance, only the placed object can be extracted by obtaining a difference from the shape of the environment. Further, when the object to be grasped is not predetermined, the operator selects the article to be grasped from the measurement data 800, the measurement data 801, and measurement data 802, thereby being capable of determining the target article. Hereinafter, the object to be grasped will be described as the measurement data 800. The article to grasped is not limited to the measurement data 800. In addition, in the case where the measurement data 101 is obtained by measuring only the article to be grasped, the measurement data 101 may be directly treated in subsequent processing.

The above processing is performed by allowing the processing device 3003 to execute the software of the grasp target measurement data setting unit 200 stored in the storage device 3004. Meanwhile, the system may not automatically select the article to be grasped, but an image shown in FIG. 8 may be presented to the operator so that the operator selects and designates a portion of the article to be grasped.

Figure 9:
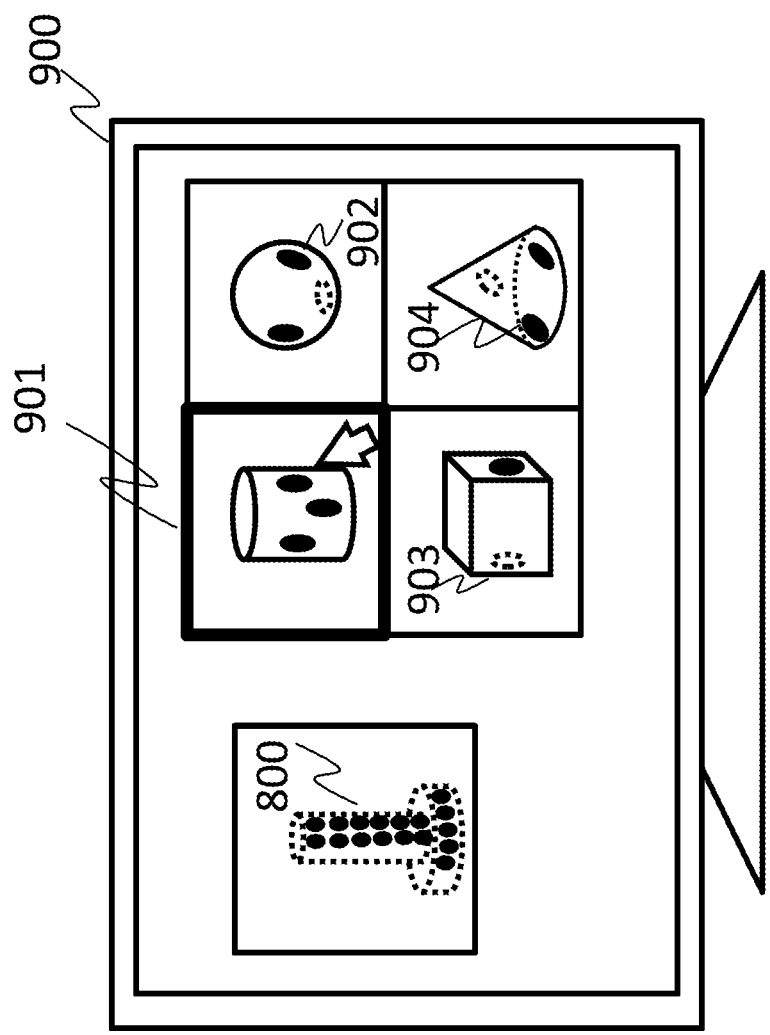
FIG. 9 is a front view of a basic shape association interface.

FIG. 9 shows a processing example of the basic shape association unit 106 that determines the basic shape and the manipulation method corresponding to the measurement data 800 of the object to be grasped which is measured by the shape measurement unit 100 and is extracted the grasp target measurement data setting unit 200.

First, the measurement data 800 of the object to be grasped and pairs 901, 902, 903, and 904 of the basis shapes and the manipulation methods which are stored in the basic shape storage unit 103 are displayed on a basic shape association screen 900 (which is a part of the output device 3001 and may be the same as the manipulation method display unit 404). The operator instructs the shape data of the object to be grasped from the displayed measurement data. In this case, as an example, the measurement data 800 is to be grasped. Further, the operator selects the pair closest to the measurement data 800 from the pairs of the basic shapes and the manipulation methods. In this example, a pair 901 of the basic shape and the manipulation method is set as the closest pair.

FIG. 9 shows an example in which the operator manually selects the closest pair from the pairs of the basic shapes and the manipulation methods. In addition, as described above, the basic shape association unit 106 can automatically select the closest pair. In this case, an algorithm similar to the operation of the following shape deformation unit 109 can be used. For example, a basic figure is first deformed into a mesh shape. The basic shapes of the mesh shape are associated with the measurement data, and a surface on the measurement data which is closest to the point on the mesh is taken as association coordinates. In addition, the closest pair can be selected on the basis of a distance between the point on the mesh and the coordinates on the measurement data. As a simple example, the basic shape having the smallest average distance value is selected.

The above processing is performed by allowing the processing device 3003 to execute the software of the basic shape association unit 106 stored in the storage device 3004 and control the input device 3001 and the output device 3002.

Figure 10:
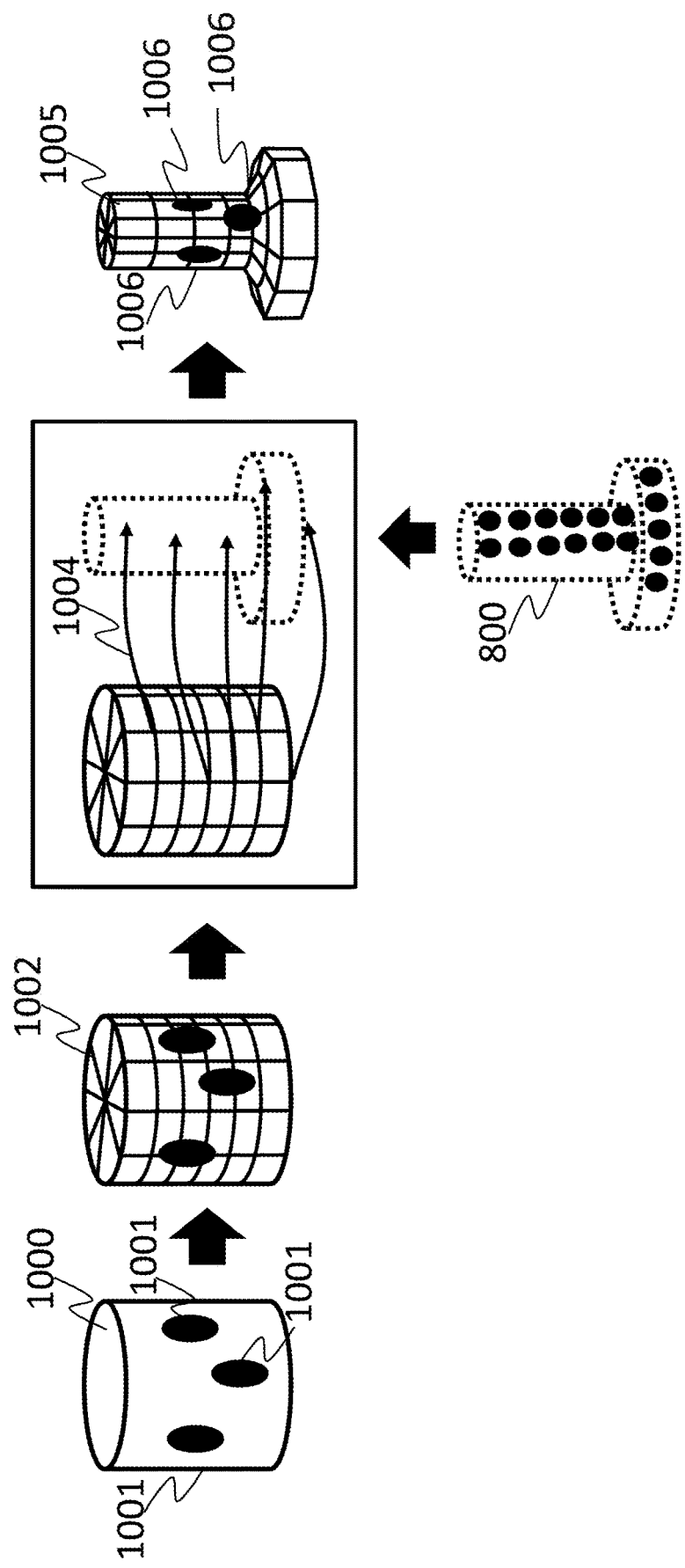
FIG. 10 is a conceptual diagram of a basic shape deformation process by a local shape transformation.

FIG. 10 shows a basic shape deformation process in which the basic shape and the manipulation method are deformed by local shape transformation according to the measured measurement data in the shape deformation unit 109. In this processing, a pair basic shape 1000 and manipulation method 1001 and the measurement data 800 are entered. First, the basic shape 1000 divided into multiple parts with the mesh to obtain a mesh shape 1002. In the transformation into the mesh, the surface of the shape may be divided into equal parts, and the respective points may be connected to each other with the use of Delaunay mesh generation or the like.

Subsequently, the mesh shape 1002 and the measurement data 800 are associated with each other, and coordinate transformation 1004 from each point on the mesh to the association coordinates is obtained. In this example, the surface on the measurement data closest to the point on the mesh is taken as the association coordinates. If a posture of the measurement data does not match a posture of the basic shape, a rotation and translation amount may be calculated as preprocessing. The rotation and translation calculation can be implemented by an existing method such as an ICP (iterative closest point) algorithm.

The coordinate transformation 1004 is implemented on all the points on the mesh, to thereby obtain a deformed basic shape 1005. Further, a deformed manipulation method 1006 is obtained according to a position of a deformation destination of the mesh corresponding to the grasp position for the manipulation method 1001.

In addition, the basic shape deformation unit 109 may simulate in advance whether the article to be grasped can be manipulated correctly, or not, when the manipulation is performed on the article to be grasped with the use of the deformed manipulation method, and may output the manipulation if the manipulation can be correctly performed. In the case of the present example, the basic shape deformation unit 109 simulates whether the finger mechanism can stably grasp the article to be grasped without dropping, or not, when applying a force with a predetermined strength to the grasp position after deformation. If the grasp is not stable, the basic shape deformation unit 109 may calculate a grasp position at which the article to be grasped can be stably grasped by searching. In the searching process, with the use of the above stability degree as an evaluation value, the manipulation position optimized by convergence calculation such as a gradient method, thereby being capable of obtaining the grasp position.

The above processing is performed by allowing the processing device 3003 to execute the software of the shape deformation unit 109 stored in the storage device 3004.

Figure 11:
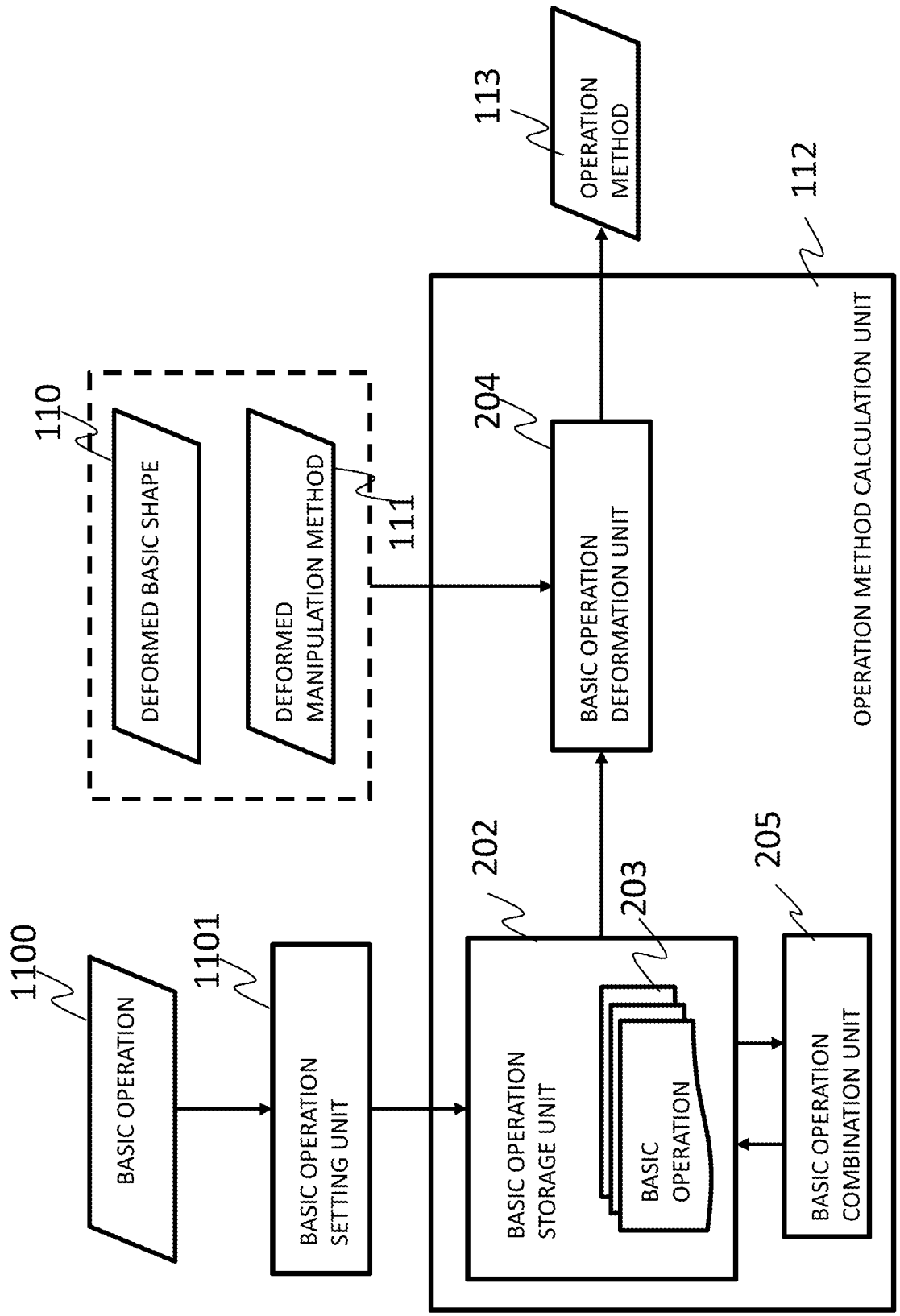
FIG. 11 is a block diagram of a configuration of an operation method calculation unit.

FIG. 11 is a diagram including data to be processed in a configuration block diagram of the manipulation method calculation unit 112. The operation method calculation unit 112 calculates the operation method 113 for operating the mechanism unit 115 according to the deformed basic shape 110 calculated by the basic shape deformation unit 119 and the deformed manipulation method 111.

First, basic operation 1100 shows basic operation for the mechanical unit 115 to achieve desired operation. For example, in the case of a system targeted for the grasp operation as in the present example, the operation of opening or closing each finger mechanism is set as the basic operation 1100. In this situation, it is assumed that the basic operation of bending and stretching is defined for each finger mechanism.

The basic operation 1100 defined in advance is input to the basic operation setting unit 1101 and stored in the basic operation storage unit 202. In the present example, it is assumed that the basic operation is stored for each mechanism, and the multiple basis operation 203 is stored in the basic operation storage unit 202.

In the present example, since the basic operation 1100 is defined for each finger mechanism, the basic operation corresponding to the number of finger mechanisms is stored.

Subsequently, the basic operation deformation unit 204 deforms the basic operation on the basis of the basic operation 203, the deformed basic shape 110, and the deformed manipulation method 111. In the present example, the basic operation deformation unit 204 adjusts the degree of closing the finger mechanisms so that the position of the operated finger mechanism matches the grasp position of the finger mechanism instructed by the deformed manipulation method. Whether the finger mechanism matches the grasp position, or not, can be calculated according to a distance between the position obtained by each finger mechanism and the instructed grasp position of the finger mechanism. The above operation is performed on all of the finger mechanisms, and the operation method can be determined for each of the finger mechanisms. Incidentally, the present operation deformation process is not limited to the grasp operation.

In this example, if multiple types of manipulation methods are set for the target basic shape, the multiple types of deformed manipulation methods 111 are obtained, and therefore multiple deformation results of the basic operation are obtained. In this case, the operation method calculation unit 112 may select the deformation result of the basic operation closest to a current posture of the mechanism unit 115 as the operation method 113.

FIG. 12 shows an example of a basic operation deformation process for creating the operation method 113 in which the basic operation deformation unit 204 deforms the basic action 203 so as to grasp the target article.

In the present example, basic operations 1200, 1201, and 1202 of the respective finger mechanisms in the mechanism unit 115 are deformed according to a deformed operation position 1204 on a deformed basic shape 1203, thereby being capable of performing the grasp operation. For example, the basic operation 1200 is deformed from pre-deformed basic operation 1205 (dotted arrow) to deformed operation 1206 (solid arrow). The amount of deformation in this situation is obtained by calculating the degree of bending the finger mechanisms such that a trajectory the finger mechanisms defined in the basic operation 1200 and the grasp position (deformed manipulation position 1204) are closest to each other. Similarly, the basic operation 1201 is deformed from the pre-deformed basic operation 1207 to the deformed operation 1208. The same is applied to the basic operation 1202.

Figure 13:
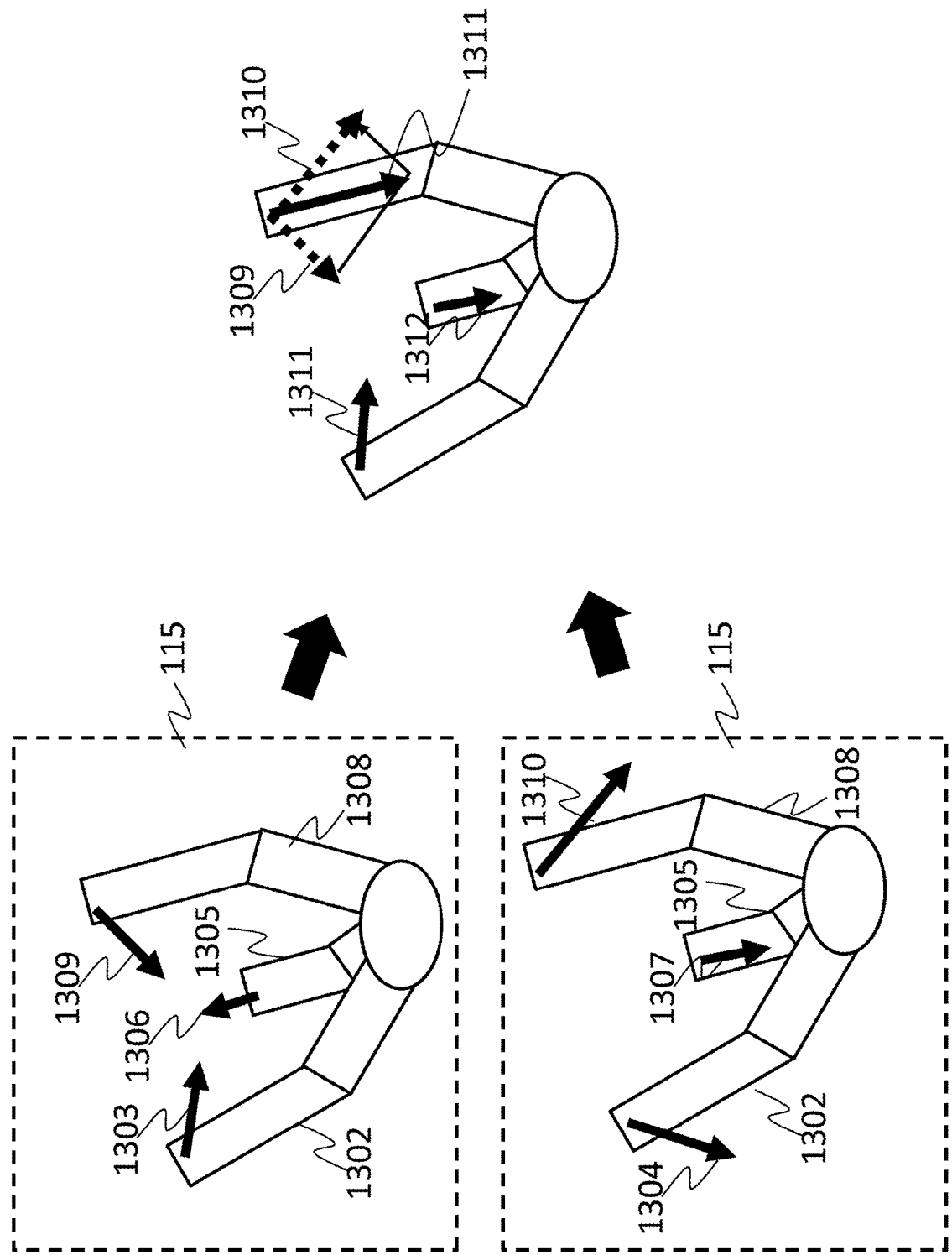
FIG. 13 is a perspective view of a basic operation combination process.

FIG. 13 shows a combination process of the basic operation 203 performed by the basic operation combination unit 205. Various types of operation can be performed by combining two or more types of basic operation together. As the combination process, a process of selecting one operation from two or more operation and a process of adding the quantity operation are shown.

First, a description will be given of a process of selecting one operation from two or more types of operations. It is assumed that basic operation 1303 and basic operation 1304 are combined together for a finger mechanism 1302 mounted on the mechanism unit 115. As the combination process, the basic operation 1303 is selected as combined operation 1311. Subsequently, a combination process for a finger mechanism 1305 will be described. When basic operation 1306 and basic operation 1307 are stored, the basic operation 1307 can be selected as combined operation 1312.

Furthermore, when basic operation 1309 and basic operation 1310 are set for a finger mechanism 1308, directions of those operations are added together as combined operation 1311. Incidentally, it is assumed that which pair of basic operation is subjected to which combination process is not limited to the above case.

Finally, the control unit 114 controls a mechanism such as a motor mounted on the mechanism unit 115 on the basis of the operation method 113 calculated up to then, to thereby grasp the target article. With the calculated grasp position as an operation target posture of the mechanism unit 115, a trajectory planning is performed with the use of a PRM (probabilistic roadmap method), an RRT (rapidly-exploring random trees), or the like, which is an operation planning method, and the control is performed with the use of a PID (proportional integral derivative) control or the like.

In this case, when the trajectory planning is performed by the control unit 114, the trajectory is calculated such that the mechanism unit 115 passes through a gap between the objects so as not to collide with the surroundings when moving the mechanism unit 115 with the use of the measurement data of the surroundings measured by the shape measurement unit 100. As a result, the operation can be performed even in a complicated environment. Alternatively, in the basic operation deformation unit 204, the operation may be deformed taking the surrounding measurement data measured by the shape measurement unit 100 into account.

According to the present example, a small number of basic shapes and manipulation methods are merely stored so that the basic shape and the manipulation method are deformed on the basis of measurement data, thereby being capable of grasping various types of shapes.

Example 2

In the present example, an example in which an adsorption manipulator is used for manipulating a target article will be described.

Figure 14:
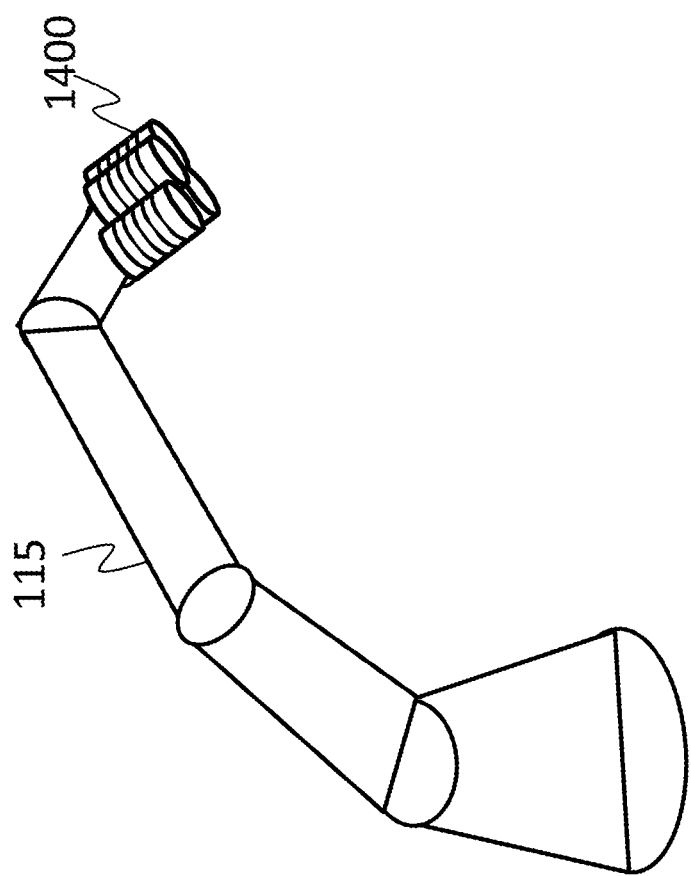
FIG. 14 is a perspective view of an adsorption manipulator.

FIG. 14 shows an example in which an adsorption manipulator 1400 is mounted on a leading end of a mechanism unit 115. The adsorption manipulator touches and adsorbs a predetermined object at the leading end to grasp the article. In the present example, an embodiment in which the adsorption manipulator is leveraged for grasping various types of articles will be described.

Figure 15:
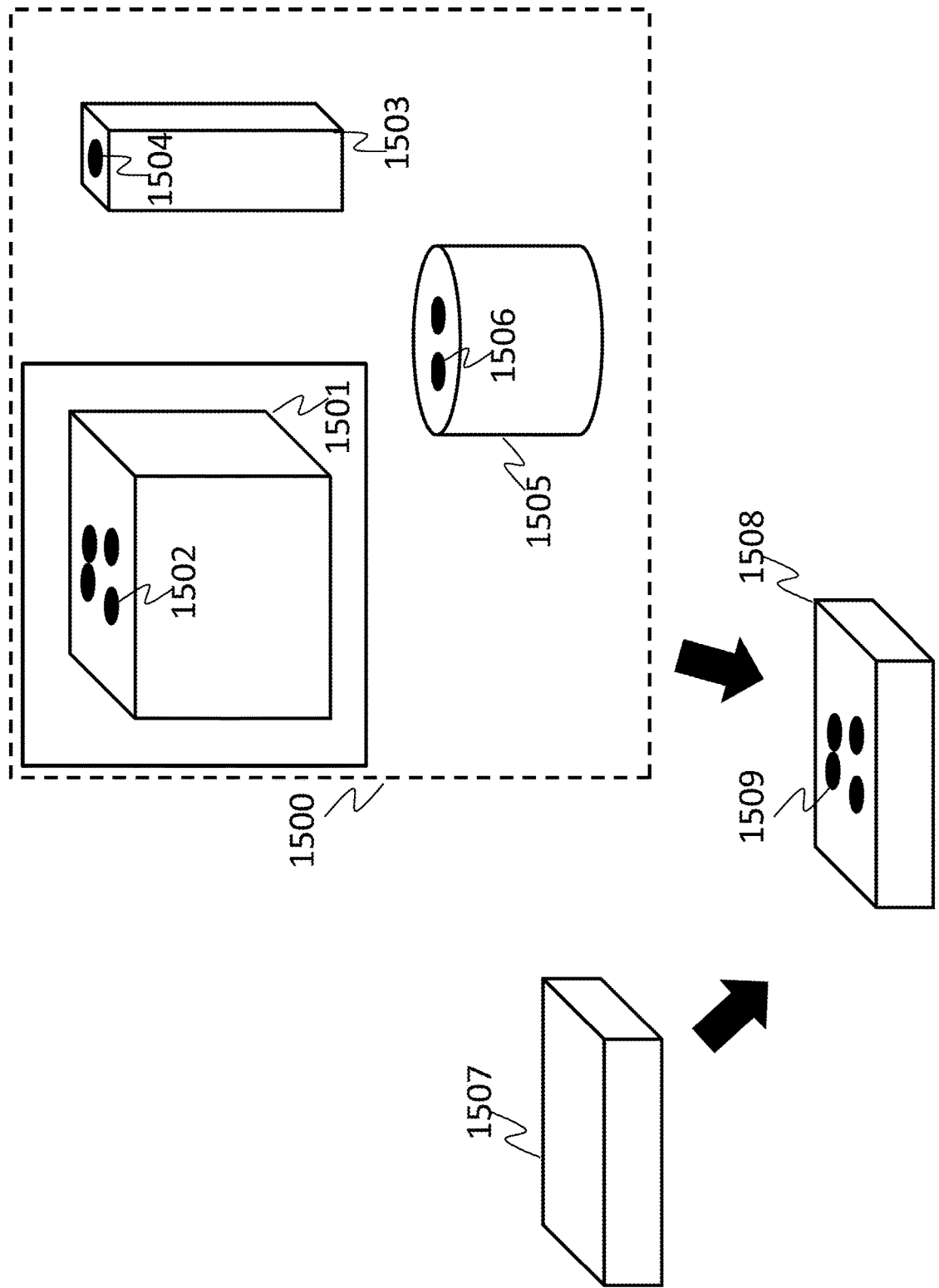
FIG. 15 is a conceptual diagram of a basic shape deformation process for the adsorption manipulator.

FIG. 15 shows a basic shape deformation process for the adsorption manipulator. In the present example, is assumed that basic shapes and manipulation methods 1500 are stored in a basic shape storage unit 103. It should be noted that the setting of the basic shapes and the manipulation methods 1500 can be implemented by the processing described in FIGS. 4 and 5.

In this case, it is assumed that a manipulation method 1502 that is paired with a basic shape 1501, and in the same way, a manipulation method 1504 that is paired with a basic shape 1503, and a manipulation method 1506 that is paired with a basic shape 1505 are stored. In this case, it is assumed that the number of adsorptions and adsorption positions corresponding to the respective adsorptions are set as the manipulation method. The adsorption manipulator changes the number of adsorption mechanisms to be used, thereby being capable of dealing with the articles with various sizes.

When measurement data 1507 has been measured, a basic shape closest to the measurement data 1507 is selected. The selection is performed by the basic shape association unit 106 described above. In the example of FIG. 15, it is assumed that the basic shape 1501 is the closest. The basic shape 1501 and the manipulation method 1502 are deformed into a deformed basic shape 1508 and a deformed manipulation method 1509. In this case, a method of deforming the basic shape and the manipulation method is performed by the basic shape deformation unit 109 described above. As a result, since the adsorption position of the target article can be determined, the adsorption manipulator is operated on the basis of the determined adsorption position and the determined adsorption position 1509 is adsorbed, thereby being capable of realizing the grasping.

Example 3

In the present example, a case in which a process of selecting a basic shape and a manipulation method corresponding to measurement data is automated in a basic shape association unit 106 will be described. In the basic shape association process shown in FIG. 9, there is a need for an operator to instruct the basic shape and the manipulation method corresponding to the measurement data every time the grasp operation is performed. On the contrary, the grasp operation can be implemented without performing the instruction operation for a pair of the basic shape and the manipulation method corresponding to the measurement data.

Figure 16:
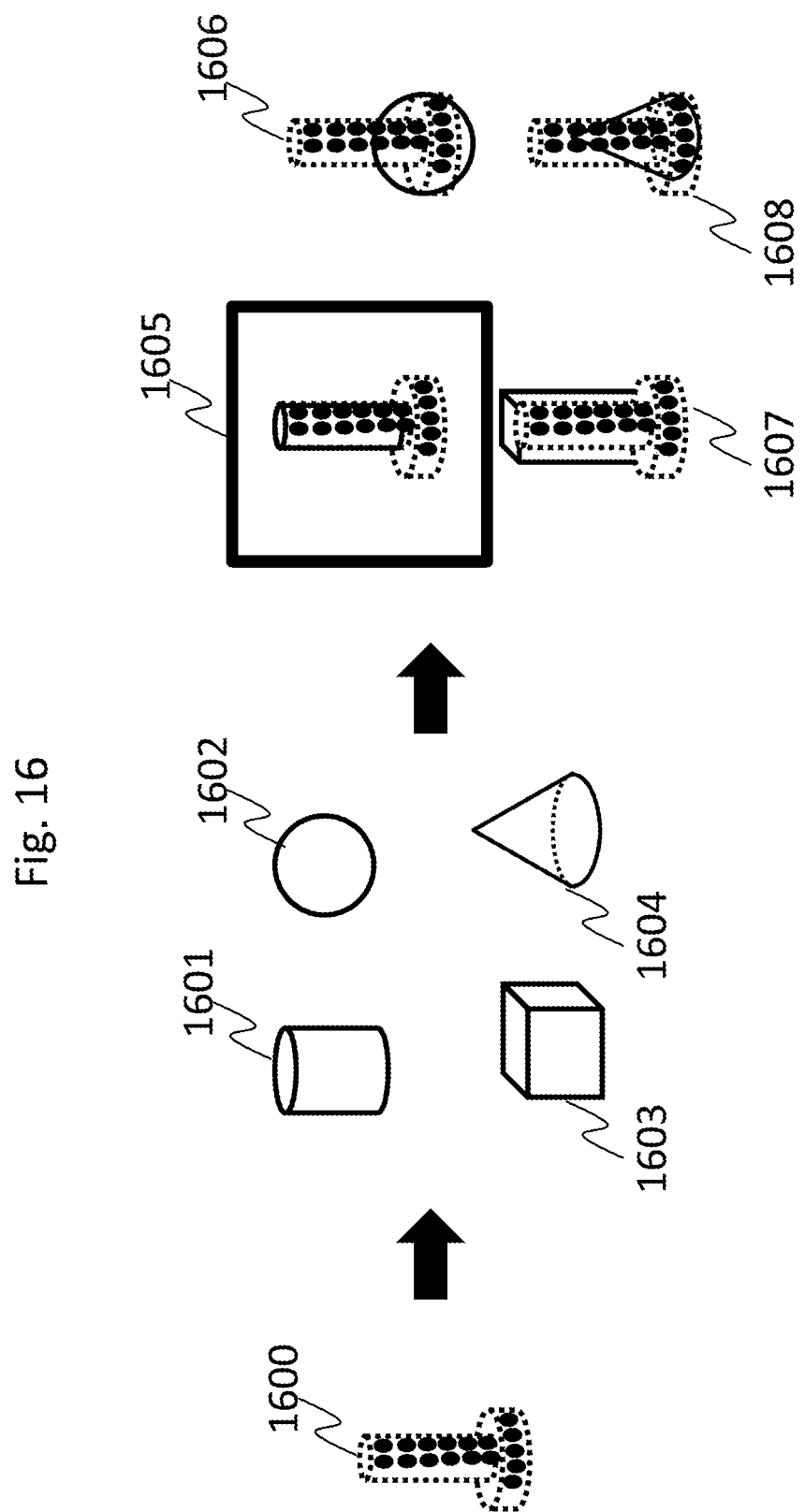
FIG. 16 is a conceptual diagram of an automatic basic shape association process.

FIG. 16 shows a processing procedure for automating the processing when the basic shape association unit 106 selects the pair of the basic shape and the manipulation method corresponding to the measurement data. In the present example, a shape of basic shapes 1601, 1602, 1603, and 1604 which closest to measurement data 1600 is calculated.

In order to calculate a difference between the basic shape and the measurement data, a basic shape deformation process may be executed on the respective basis shapes by a basic shape deformation unit 109, and a shape smallest in the difference may be calculated with the use of differences between changed shapes 1605, 1506 1607, and 1608 and measurement data 1600. The difference can be calculated with the use of a sum of distances from respective points of the measurement data to a closest surface of the deformed basic shape. It is assumed that a technique for calculating the difference between the shapes is not limited to the above technique. In the example of FIG. 16, the difference between the changed shape 1605 and the measurement data 1600 is the smallest, and the basic shape 1601 is selected.

When the article to be measured is known, the basic shape association unit 106 may store in advance a pair of the basic shape and the manipulation method corresponding to the article to be measured, and associate the stored pair of the basic shape and the manipulation method with each other.

Example 4

Figure 17:
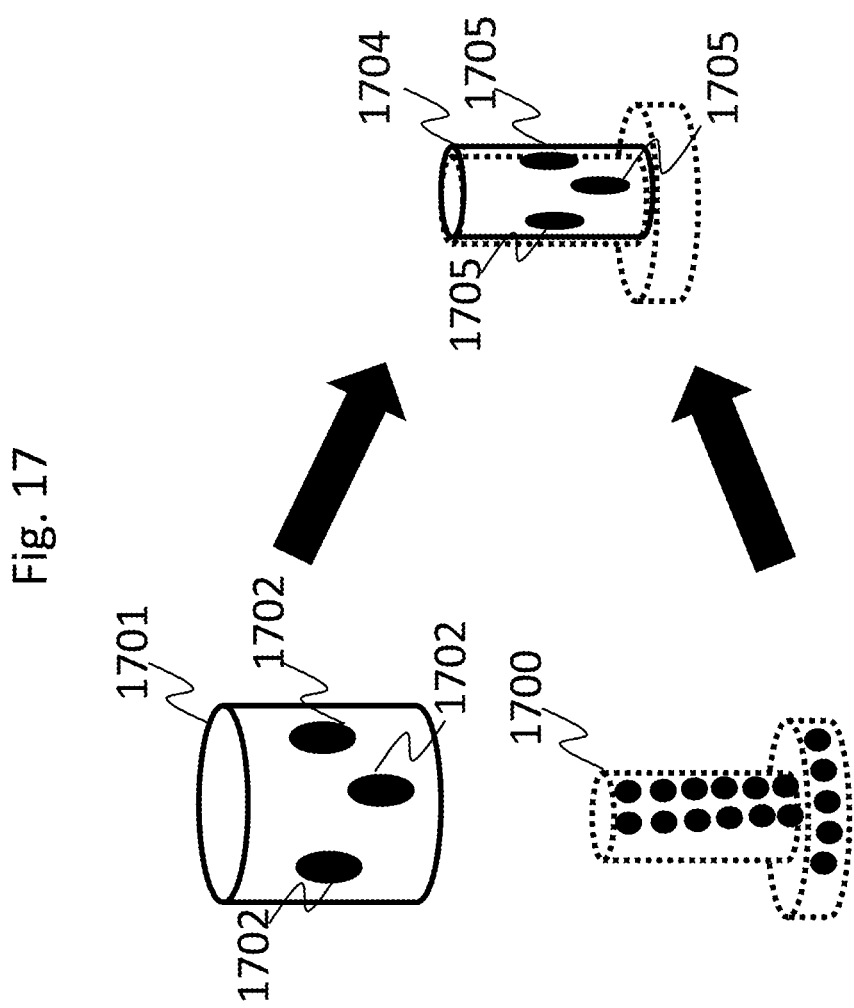
FIG. 17 is a conceptual diagram of the basic shape deformation process by linear transformation.

FIG. 17 shows another example of the processing of a basic shape deformation unit 109. FIG. 17 shows a basic shape deformation process in which the basic shape deformation unit 109 linear transforms basic shapes and manipulation methods according to measured measurement data 1700 to implement deformation.

In the basic shape deformation process, a pair of a basic shape 1701 and a manipulation method 1702 and the measurement data 1700 are entered. The basic shape 1701 and the measurement data 1700 are compared with each other, and subjected to geometrical matching to obtain the most matching transformation amount. In this case, the transformation amount is set as a magnification ratio related to rotation, translation, and each axis, and obtained by searching a value with the most matching shape. A specific method is matching by full search, a gradient method, an ICP algorithm, or the like. The determination as to whether there is the matching transformation amount, or not, can be calculated by counting how many points are placed on a surface of a deformed basic shape 1704 among the points on the measurement data 1700. The obtained transformation amount is applied to the basic shape 1701 and the manipulation method 1702, to thereby obtain the deformed basic shape 1704 and the deformed manipulation method 1705.

Example 5

Figure 18:
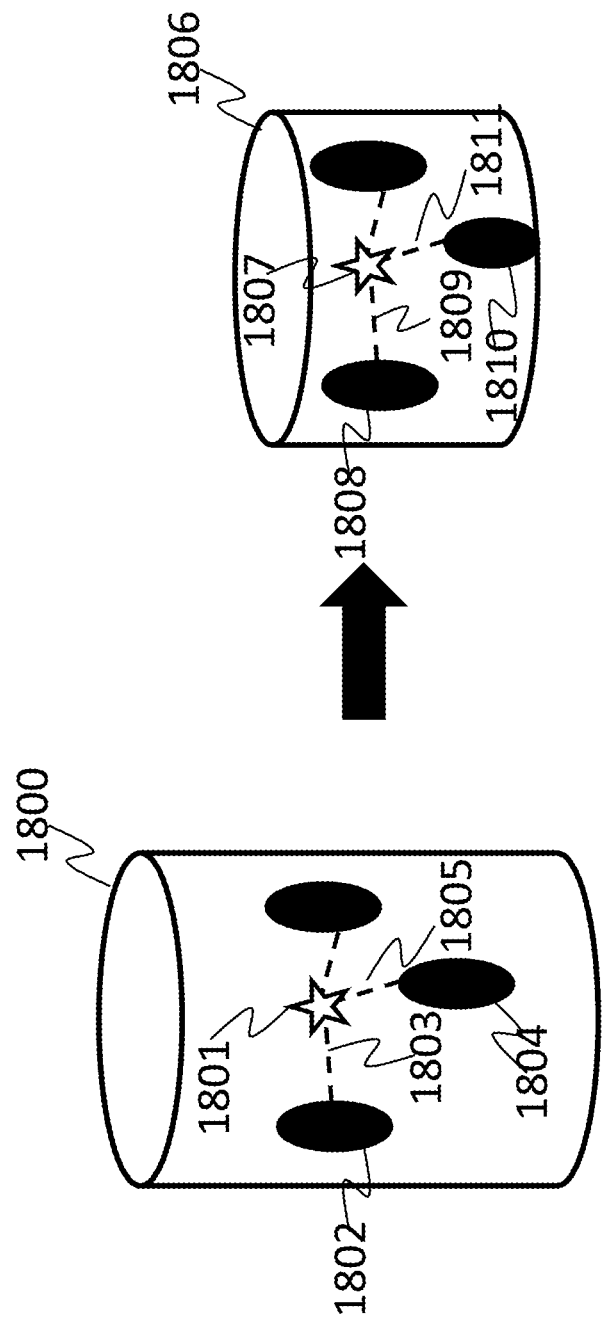
FIG. 18 is a conceptual diagram of a manipulation method deformation process on the basis of a position of the center of gravity.

FIG. 18 shows another example of the processing of the basic shape deformation unit 109. FIG. 18 shows a process of deforming the manipulation method on the basis of a position of the center of gravity of measurement data when the basic shape deformation unit 109 deforms the manipulation method.

In the basic shape deformation process shown in FIGS. 10 and 17, the manipulation method is changed to be equal to the degree of deformation of the basic shape. If a basic shape 1800 shown FIG. 18 is deformed into a changed basic shape 1806 with the use of the above technique, a relative distance 1805 from a position of the center of gravity 1801 is reduced, and three grasp positions are aligned. This results in a problem that the operation becomes unstable.

On the contrary, when the manipulation method is deformed, only the position of the center of gravity 1801 is moved with the manipulation of the basic shape as a new position of the center of gravity 1807. The relative distances to the respective manipulation positions from the position of the center of gravity 1801 (in FIG. 18, a relative distance 1803 to a grasp position 1802, a relative distance 1805 to a grasp position 1804, and so on) are maintained, a relative distance 1809 to a new grasp position 1808 from the new position of the center of gravity 1807 is set to be equal to the relative distance 1803, and a relative distance 1811 to a new grasp position 1810 from the new position of the center of gravity 1807 is set to be equal to the relative distance 1805. As a result, the three grasp positions on the deformed basic shape 1806 are not aligned with each other and stable grasping can be performed.

According to the example described above, the basic operation registered in advance is deformed, thereby being capable of generating a flexible operation method with a combination of a small number of operation instructions. In addition, the basic shapes registered in advance and the manipulation methods corresponding to the basic shapes are deformed according to the measurement data of the object to be manipulated which is obtained by measurement, thereby being capable of determining the manipulation method for a shape not registered. Therefore, an appropriate operation method (for example, a driving procedure of the actuator) can be generated on the basis of the deformed manipulation method. As a result, various kinds of articles can be treated with only a small number of preregistration, and if the shape is close to the preregistered article, an unknown article can be treated.

The present invention is not limited the respective embodiments described above, but includes various modifications. For example, a part of one configuration example can be replaced with another configuration example, and the configuration of one example can be added with the configuration of another example. Moreover, in a part of the respective configuration examples, another configuration can be added, deleted, or replaced.

INDUSTRIAL APPLICABILITY

The present invention is available to various robot systems handling articles.

REFERENCE SIGNS LIST

100: shape measurement unit, 101: measurement data, 102: basic shape setting unit, 103: basic shape storage unit, 104: basic shape, 105: manipulation method, 106: basic shape association unit, 107: selected basic shape, 108: selected manipulation method, 109: basic shape deformation unit, 110: deformed basic shape, 111: deformed manipulation method, 112: operation method calculation unit, 113: operation method, 114: control unit, 115: mechanism unit, 200: grasp target measurement data setting unit, 201: basic shape combination unit, 202: operation storage unit, 203: the present operation; 204: basic operation deformation unit, 300: article, 400: basic shape, 401: basic shape input unit, 404: manipulation method display unit, 402: manipulation method instruction unit, 403: manipulation method, 600: basic shape A, 601: manipulation method A, 602: basic shape B, 603: manipulation method B, 604: shape combination processing unit, 605: basic shape C, 606: manipulation method instruction unit, 607: manipulation method, 608: manipulation method display unit, 800: measurement data, 801: measurement data, 802: measurement data, 900: basic shape association screen, 901: pair of basic shape and manipulation method, 902: pair of basic shape and manipulation method, 903: pair of basic shape and manipulation method, 904: a pair of basic shape and manipulation method, 1000: the present shape, 1001: manipulation method, 1002: mesh shape, 1004; coordinate transformation, 1005: deformed basic shape, 1006: deformed manipulation method, 1100: basic operation, 1101: basic operation setting unit, 1200: basic operation, 1201: basic operation 1202: basic operation, 1203: deformed basic shape, 1204: deformed manipulation position, 1205: pre-deformed basic operation, 1206: deformed operation, 1207: pre-deformed basic operation, 1208: deformed operation, 1302: finger mechanism, 1303: basic operation, 1304: basic operation, 1305: finger mechanism, 1306: basic operation, 1307: basic operation, 1308: finger mechanism, 1309: basic operation, 1310: basic operation, 1311: combined operation, 1312: combined operation, 1400: adsorption manipulator, 1500: basic shape and operation method, 1501: basic shape, 1502: manipulation method, 1503: basic shape, 1504: manipulation method, 1505: basic s-ape, 1506: manipulation method, 1507: measurement data, 1508: deformed basic shape, 1509: deformed operation method, 1600: measurement data, 1601: basic shape, 1602: basic shape, 1603: basic shape, 1604: basic shape, 1700: measurement data, 1701: basic shape, 1702: manipulation method, 1704: deformed basic shape, 1705: deformed manipulation method, 1800: basic shape, 1801: position of the center of gravity, 1802: grasp position, 1803: relative distance, 1804: grasp position, 1805: relative distance, 1806: changed basic shape, 1807: position of the center of gravity, 1808: grasp position, 1809: relative distance, 1810: grasp position, 1811: relative distance

The invention claimed is:
1. A robot system comprising:
a mechanism unit that manipulates an article to be manipulated;
a shape measurement unit that measures a shape of an object;
a basic operation storage unit that stores basic operation representing basic operation of the mechanism unit;
an operation method calculation unit that deforms the stored basic operation to calculate an operation method on the basis of the shape of the object measured by the shape measurement unit; and
a control unit that executes a control of the mechanism unit on the basis of the operation method calculated by the operation method calculation unit.
2. The robot system according to claim 1, further comprising:
a basic shape storage unit that stores at least one or more pairs of basic shapes showing a predetermined shape and manipulation methods for the basic shapes by the mechanism unit;
a basic shape association unit that selectively associates at least one of the basic shapes stored in the basic shape storage unit for the shape measured by the shape measurement unit with a selected basic shape; and
a basic shape deformation unit that deforms the selected basic shape and a selected manipulation method that is the manipulation method paired with the selected basic shape according to the measured shape, wherein
the operation method calculation unit includes a basic operation deformation unit that deforms the basic operation on the basis of the deformed selected basic shape and the deformed selected manipulation method which have been deformed by the basic shape deformation unit, and the operation method calculation unit calculates the operation method on the basis of the deformed basic operation that has been deformed by the basic operation deformation unit.

3. The robot system according to claim 1, further comprising a grasp target measurement data setting unit that extracts a shape of the article to be manipulated from the shapes of the object measured by the shape measurement unit.

4. The robot system according to claim 1, wherein the basic shape deformation unit performs linear transformation to cause the selected basic shape to match the shape of the measured object.

5. The robot system according to claim 1, wherein the basic shape deformation unit locally deforms the selected basic shape for each part to cause the selected basic shape to match the shape of the measured object.

6. The robot system according to claim 1, wherein the basic shape deformation unit performs the deformation of the selected manipulation method on the basis of a relative distance from a center of gravity of the measured object.

7. The robot system according to claim 1, wherein the control unit operates the mechanism unit according to a state or a surrounding clearance with reference to the shape measured by the shape measurement unit to prevent the mechanism unit from colliding with surroundings.

8. The robot system according to claim 1, further comprising a basic shape combination unit that combines two or more types of the basic shapes into a new basic shape.

9. The robot system according to claim 1, further a basic operation combination unit that combines two or more types of the basic operation into new basic operation.

10. The robot system according to claim 1, wherein the basic shape association unit selects one of the plurality of basic shapes having the smallest magnitude of a geometrical difference from the shape measured by the shape measurement unit.

11. The robot system according claim 1, wherein the manipulation method is defined by a position at which the basic shape is grasped.

12. The robot system according to claim 1, wherein the manipulation method is defined by a position at which the basic shape is sucked and the number of points to be sucked.

13. A control method for controlling a mechanism unit by an information processing device including a processing device, a storage unit, an input device, and an output device, the storage unit stores at least one or more pairs of basic shapes showing a predetermined shape and manipulation methods for the basic shapes by a mechanism unit;

the processing device selects one basic shape from the stored basic shapes, and associates the selected basic shape with a measured shape input from the input device;

the processing device deforms the associated basic shape and the manipulation method that is paired with the associated basic shape according to the measured shape;

the processing device calculates the operation method of the mechanism unit on the basis of the deformed basic shape and the deformed manipulation method; and the processing device executes the operation of the mechanism unit on the basis of the operation method.

14. The control method according to claim 13, wherein the storage unit stores a basic operation representing a basic simple operation of the mechanism unit, when calculating the operation method of the mechanism unit, the processing device deforms the basic operation to be compatible with the deformed operation method, and the processing device calculates the operation method according to the deformed basic operation.

15. The control method according to claim 13, wherein when the storage unit stores the basic shapes and the manipulation methods for the basic shapes by the mechanism unit in pairs, the storage unit stores each basic shape paired with a plurality of manipulation methods, and the processing device deforms the plurality of manipulation methods according to the measured shape, and when the processing device calculates the operation method of the mechanism unit, the processing device selects a result closest to a current posture of the mechanism unit from the plurality of manipulation methods deformed according to the measured shape as the operation method.

* * * * *